(12) United States Patent
Arno

(10) Patent No.: US 9,413,242 B2
(45) Date of Patent: Aug. 9, 2016

(54) DC/DC CONVERTER HAVING A STEP-UP CONVERTER SUPPLYING A STEP-DOWN CONVERTER

(71) Applicant: ST-Ericsson SA, Plan-les-Ouates (CH)

(72) Inventor: Patrik Arno, Sassenage (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 28 days.

(21) Appl. No.: 14/363,056

(22) PCT Filed: Dec. 5, 2012

(86) PCT No.: PCT/EP2012/074541
§ 371 (c)(1),
(2) Date: Jun. 5, 2014

(87) PCT Pub. No.: WO2013/092218
PCT Pub. Date: Jun. 27, 2013

(65) Prior Publication Data
US 2014/0333276 A1 Nov. 13, 2014

Related U.S. Application Data

(60) Provisional application No. 61/586,858, filed on Jan. 16, 2012.

(30) Foreign Application Priority Data

Dec. 21, 2011 (EP) ..................................... 11306736

(51) Int. Cl.
*H02M 3/158* (2006.01)
*H02M 3/335* (2006.01)
*H02M 1/00* (2006.01)

(52) U.S. Cl.
CPC ........ *H02M 3/1582* (2013.01); *H02M 3/33569* (2013.01); *H02M 2001/007* (2013.01)

(58) Field of Classification Search
CPC ................... H02M 3/1582; H02M 2001/0007; H02M 3/158; H02M 3/1588
See application file for complete search history.

(56) References Cited

U.S. PATENT DOCUMENTS

| | | | |
|---|---|---|---|
| 6,798,177 B1 | 9/2004 | Liu et al. | |
| 7,173,403 B1 * | 2/2007 | Chen | H02M 3/157 323/282 |
| 2005/0104570 A1 * | 5/2005 | Lee | H03F 3/217 323/282 |

FOREIGN PATENT DOCUMENTS

| | | |
|---|---|---|
| AT | 505 734 A1 | 3/2009 |
| WO | 96/07960 A1 | 3/1996 |

OTHER PUBLICATIONS

International Search Report issued in corresponding International application No. PCT/EP2012/074541, date of mailing May 13, 2014.
Written Opinion of the International Searching Authority issued in corresponding International application No. PCT/EP2012/074541, date of mailing May 13, 2014.

* cited by examiner

*Primary Examiner* — Harry Behm
*Assistant Examiner* — Peter Novak
(74) *Attorney, Agent, or Firm* — Patent Portfolio Builders PLLC

(57) ABSTRACT

A DC-DC converter has a Step-Up stage connected to a Step-Down stage. A common Step-Down controller is designed and configured such that a single reference voltage is compared to the output voltage of the Step-Down stage by a single comparator, producing a single error signal. The error signal is then compared to two different saw signals to generate first and second pulse-width modulated signals respectively. The first and second pulse-width modulated signals are inputted to a control unit that generates a first pair of control signals and a second pair of control signals, which control switching of the Step-Up stage and of the Step-Down stage.

16 Claims, 15 Drawing Sheets

SAW Magnitude: SAW$_{MAG}$
Duty-Cycle: Dcycle

DC/DC CONVERTER HAVING A STEP-UP CONVERTER SUPPLYING A STEP-DOWN CONVERTER

BACKGROUND OF THE INVENTION

1. Technical Field

The present invention generally relates to techniques for generating convenient supply voltages for electronic circuits of portable electronic devices, and more particularly to a DC-DC converter having a step-up converter supplying a step-down converter, also called a DC-DC step-down converter.

It finds applications, in particular, in electronic circuits which may be used in battery-powered electronic devices such as cellular phones, smart phones, digital walk-men, portable computers, PDA and similar portable electronic devices.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

New technology batteries, so called low "cut-off" batteries, used in portable electronic devices, deliver low voltages, e.g. as low as 2.5 Volts, compared to standard system higher voltage values of, for instance, ca. 3.6 Volts.

It is also desirable to provide efficient power circuitry to ensure a maximum duration between device battery charges. In particular, applications wherein the output voltage is amplitude modulated rely on quickly changing voltage regulators, for instance using DC-DC down-converting structures of the Step-Down type. Indeed, in power amplifiers, efficiency varies with the RF signal amplitude. Usually the yield is maximal at full power and drops rapidly when the amplitude of the modulated signal decreases, as a larger part of the supply voltage is not used and is thus dissipated in transistors.

Known regulated Step-Down DC-DC converters may partly compensate for this drawback and save battery power by reducing the supply voltage used for driving the RF power amplifier by tracking the signal amplitude with an efficient power supply modulator having a quick response. This technique is known as "envelope tracking". But, eventually, the standard Step-Down converter cannot output a voltage superior to the supply voltage.

Most circuits within said devices do not require a high voltage to achieve satisfying operating conditions, with values as low as 2.5 Volts proving sufficient. However, some circuits within said portable electronic devices require a high voltage to generate high power, for instance the Radio Frequency Power Amplifier (RFPA) module of a mobile phone when transmitting data modulated and carried by an RF signal, via a radio-frequency (RF) antenna of the mobile phone. In instances such as those of GSM applications, where the RFPA requires at least a 3.3V supply to generate a specified maximum power value, the RFPA output may be reduced or the device shut down if this is impossible.

One method of achieving higher voltage in battery-powered portable electronic devices is the stacking of cells in series. However, space constraints often result in stacking insufficient to achieve the required high voltage.

Another method is based on the use of DC-DC up-converters, which can be realized, as switched-capacitor and inductive converters, to generate of a high supply voltage from the low battery voltage, namely a supply voltage of higher value than said battery voltage.

For instance, a Step-Up converter may be introduced into a circuit to raise the supply voltage from the battery. Unfortunately, Step-Up converters have very low bandwidth and higher output ripple than linear converters. Indeed, as they produce the output signal as a pulse-width modulated (PWM) signal by switching between a supplied voltage of the battery and a ground voltage value, a high level of ripples is generally obtained, even after filtering. Low ripple behaviour is however a stringent parameter, especially for DC-DC converters dedicated to supply power for RF applications, because the ripples may create interferences with RF signals. They thus decrease the signal-to-noise ratio (SNR) of the RF signal emitted by the portable electronic device. Low bandwidth may further result in a stringent limitation if the circuit designer wants to use the "envelope tracking" technique to enhance the RF power amplifier efficiency. Therefore, a compromise generally has to be found between the bandwidth of the converter, the amplitude of the output ripples, and the switching frequency of the PWM signal.

One solution to deal with ripple and bandwidth is to use a cascaded architecture where a Step-Up DC-DC converter supplies a Step-Down converter (inherently having high bandwidth and low ripple) and connect the RF power amplifier to the output of the Step-Down converter. Such a solution may provide high efficiency for a wide range of conversion ratios. In particular, this modular architecture is suitable for providing modulation with the correct bandwidth and spurious attenuation.

However, adding a Step-Up control loop to the closed loop Step-Down converter circuit raises difficulties with the stabilisation of both loops. Further, to achieve maximum efficiency in loops containing both Step-Up and Step-Down converters, the voltage drop between the Step-Up output and the Step-Down output should be minimised. However, given the battery voltage and output power of RFPA this can be difficult, often requiring the selection of a number of output voltages of the Step-Up converter leading to sub-optimal operating conditions.

SUMMARY

Therefore, there is a need to provide a DC-DC converter having a Step-Up converter supplying a Step-Down converter in an electronic circuit of minimal complexity that is able to generate disparate voltages when required, particularly in order to overcome at least part of the above drawbacks.

Accordingly, there is proposed a converter comprising:
 an input terminal adapted to receive an input voltage;
 a Step-Up stage having an input connected to the input of the DC-DC converter to receive the input voltage and an output, and a step-down stage having an input coupled to the output of the step-up converter and an output, said step-up stage and step-down stage being controlled by a first control signals and by second control signals, respectively;
 an output terminal connected to the output of the step-down stage so as to receive an output voltage of said Step-Down stage to drive a load which may be coupled to said output terminal; and,
 a controller adapted to generate the first control signals and the second control signals, said controller comprising a single error signal generator (61) adapted to generate a single error signal from the difference between the output voltage of the Step-Down stage and a single reference voltage, and to generate both the first control signals and the second control signals from said error signal.

Thus, the DC-DC converter has a cascaded architecture with a Step-up converter structure supplying a Step-Down converter structure in a single loop, the output of the Step-Down converter structure connecting to the load, which may be a RFPA. The high output ripple and low bandwidth of the Step-Up converter supplies the Step-Down converter, which, when employed in isolation, produces low output ripple and high bandwidth.

In some embodiments, the controller further comprises:
a first comparator adapted to generate a first pulse-width modulated, PWM, control signal on the comparison of the error signal with a first saw signal;
a second comparator adapted to generate a second PWM control signal based on the comparison of the error signal with a second saw signal different from the first saw signal; and,
a control unit adapted to generate the first control signals and the second control signals based on the first PWM control signal and the second PWM control signal, respectively.

Stated otherwise, the error signal is compared to first and second saw signals to generate pulse-width modulated signals corresponding to step-up and step-down loops respectively. The control unit subsequently generates first and second PWM control signals that are used for generating the control signals for the Step-Up and Step-Down stages respectively.

The DC-DC converter is thus configured in a closed loop, the loop having a single reference voltage. With the Step-Down converter in 'routine' mode, this reference voltage is compared to the step-down output voltage by a comparator, producing the error signal. The error signal is compared to two different saw signals in order to generate first and second PWM signals that control power stage switching.

With the step-down converter in a 'regulation' mode, the error signal of the step-down control loop is used to control the step-up duty cycle in a master-slave topology such that the step-up loop is only switched on when required. Thus, the circuit is further simplified and power consumption optimised. The error signal may be inputted into the step-up loop to control the step-up duty cycle and step-up output voltage, the latter subsequently supplying the input of the step-down phase of the circuit. The step-up output voltage and drop between step-up and step-down voltages may be controlled with saw signal values.

When the step-down converter is in 'routine' mode, only the Step-Down stage is activated. An input voltage, e.g. a battery voltage is input into the Step-Up stage, the output of which is connected to the Step-Down stage input. The error signal at the output of the error amplifier is generated by the comparison between the (step-down) voltage reference and the step-down output voltage.

According to further embodiments, the controller may be further configured to control the magnitude of the first saw signal such that it is proportional to the output voltage of the Step-Up stage. Thereby, the transfer function of the step-up converter is linear versus the error signal, as it is for the Step-Down stage.

The controller of the DC-DC converter may further be adapted for controlling the offset of the first saw signal such that the minimum voltage value of said first saw signal is proportional to the input voltage. Such embodiments provide the advantage that the output voltage of the Step-Up stage is independent from the line-Transient whereas the duty-cycle of becomes dependent on line transient. Thus, line-transient compensation may be added to the step-up converter without adding complexity to the system. Ordinarily, step-up output varies as a function of line-transient. In the present embodiments, the output voltage becomes independent as a result of making the minimum voltage of the saw signal associated with the Step-Up stage proportional to the input, e.g., battery voltage. The step-up duty-cycle is compensated, and is thus independent of line transient, maintaining the step-up output voltage at a constant value as battery voltage decreases.

In some further embodiments, the duty-cycle of the first PWM control signal and the duty-cycle of the second PWM control signal may be managed by tuning the magnitude value and average value of the first saw signal and of second saw signal respectively. For instance, both the magnitude and average values of first and second saw signals may be tuned in order to manage the PWM control signal duty cycles.

Advantageously, the input of the Step-Down stage may be directly connected to the output of the Step-Up stage. Hence, the voltage drop between the step-up output voltage and the step-down output voltage is minimised.

In some embodiments, provision can be made so that, in a first mode of operation, the controller is adapted to cause the first control signals the second control signals to toggle so that the Step-Up stage and the Step-Down stage are simultaneously activated.

In a variant or in addition, in a second mode of operation, the controller may be further adapted to cause only the first control signals, not the second control signals, to toggle so that only the Step-Down stage is activated.

In further embodiments, the controller is adapted to limit the maximum duty cycle for the Step-Up stage by PWM masking. In other words, PWM masking may be used to limit the maximum duty cycle for the Step-Up converter. An AND gate may be controlled by the PWM step-up converter signal and by an external signal with the same frequency as PWM control signal for the Step-Up stage. A desirable percentage of the step-up duty cycle is selected and the maximum value of the PWM cycle is clamped to the selected percentage.

Another aspect of the teachings proposed herein relates to a portable electronic device comprising:
a battery adapted to provide a battery voltage;
DC-DC converter according to anyone of claims 1 to 9, adapted to generate a supply voltage from the battery voltage, higher than said battery voltage; and,
a Radio-Frequency Power Amplifier powered by the supply voltage.

BRIEF DESCRIPTION OF THE DRAWINGS

The present invention is illustrated by way of example, and not by way of limitation, with reference to the accompanying drawings, in which like reference numerals refer to similar elements and in which.

DESCRIPTION OF PREFERRED EMBODIMENTS

Figure 1:
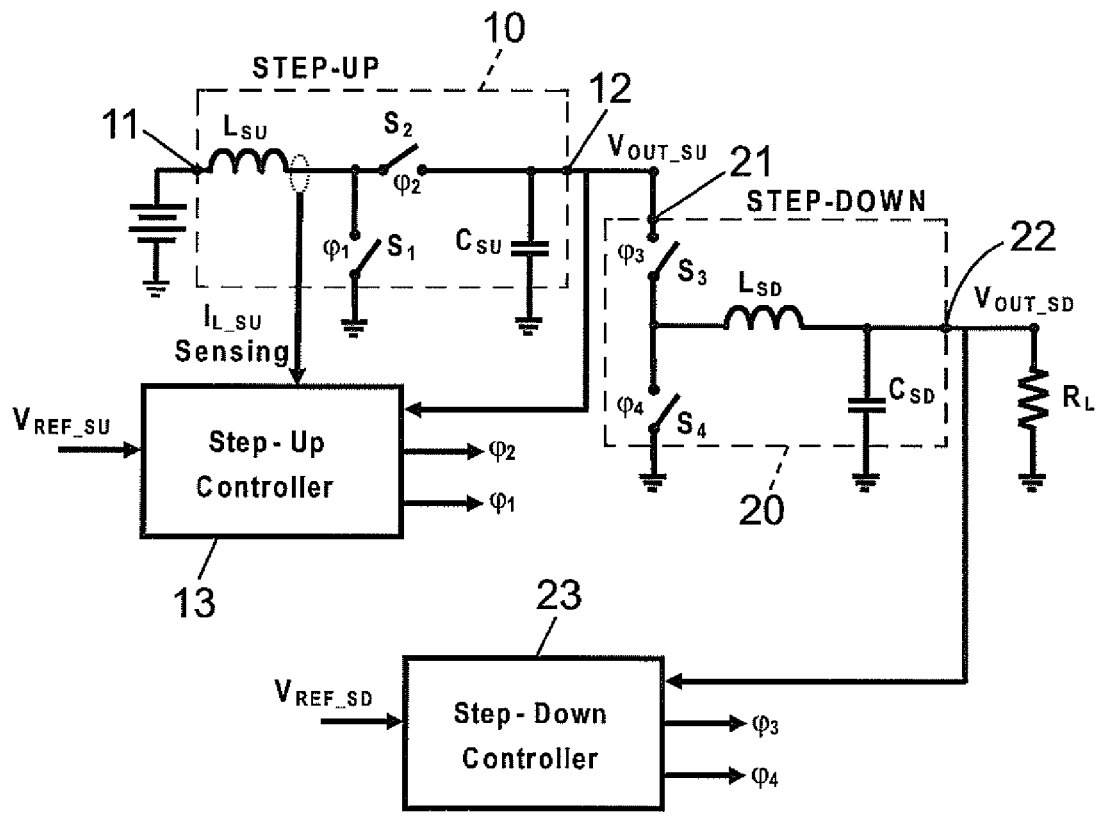
FIG. 1 is schematic circuit diagram showing a cascaded architecture of a DC-DC converter circuit including a Step-Up converter which supplies a Step-Down converter.

With reference to FIG. 1, there will first be described a cascaded architecture of a DC-DC converter circuit including a Step-Up (SU) converter 10 which supplies a Step-Down (SD) converter 20.

The DC-DC converter circuit comprises an input terminal 11, which is also the input of the SD converter 10. This input receives an input voltage VBAT supplied from the battery of the portable electronic device embodying the DC-DC converter circuit. The DC-DC converter also comprises an output terminal 22, which is also the output of the SD converter. The output terminal is adapted to drive power to a load; for instance, a RF power amplifier is represented by impedance RL for the sake of simplicity of the drawing and of the present description. The output terminal 12 of the SU converter 10 is coupled, for instance directly connected, to the input terminal 21 of the SD converter 20.

The design of the SU and SD converters, as such, is well known in the art.

As regards the SU converter 10, an inductor $L_{SU}$ is connected by a first end to the input terminal 11, and by a second end to a ground terminal through a first controlled switch $S_1$. The second end of inductor $L_{SU}$ is further connected to the output terminal 12 of the SU converter 10 through a second controlled switch $S_2$. Finally, a capacitor $C_{SU}$ is connected by one end to the output 12 of the SU converter 10 and by the second end to the ground terminal.

The SD converter 20 comprises an inductor $L_{SD}$ which is connected by a first end to the input terminal 21 of the SD converter 20 through a third controlled switch $S_3$, and by a second end to a ground terminal through a fourth controlled switch $S_4$. The second end of inductor $L_{SD}$ is further connected to the output terminal 22 of the SU converter 10. Finally, a capacitor $C_{SD}$ is connected by one end to the output 22 of the SD converter 10 and by the second end to the ground terminal.

The state ON/OFF of the switches $S_1$, $S_2$, $S_3$ and $S_4$ are controlled by control signals $\phi_1$, $\phi_2$, $\phi_3$ and $\phi_4$, respectively.

The DC-DC converter circuit further comprises a first control unit or Step-Up controller 13 for controlling the SU stage 10, and a second control unit or Step-Down controller 23 for controlling the SD stage 20. It further comprises first and second output for outputting control signals $\phi_1$ and $\phi_2$, respectively.

Step-Up controller 13 comprises a first input for receiving a Step-Up reference voltage $V_{REF\_SU}$, a second input for receiving the output voltage $V_{OUT\_SU}$ at output 12 of the SU stage 10, and a third input for receiving a signal representative of the current $I_{L\_SU}$ flowing through inductor $L_{SU}$ of the SD stage 10.

Step-Down controller 23 comprises an input for receiving a Step-Down reference voltage $V_{REF\_SD}$, and a second input for receiving the output voltage $V_{OUT\_SD}$ at output 22 of the SD stage 20. It further comprises first and second output for outputting control signals $\phi_3$ and $\phi_4$, respectively.

Detailed description of the operation of the cascaded SU and SD converter, in respect of the pairs of control signals $\phi_1$, $\phi_2$, and $\phi_3$, $\phi_4$, respectively, is not necessary and would go beyond the purpose of the present description. The one with ordinary skills in the art is aware of the timing of the control signals $\phi_1$, $\phi_2$, and $\phi_3$, $\phi_4$, necessary to obtain the desired step-up and step-down feature, respectively.

The main issue for controlling the converter in closed loop is the stabilization of the loops.

Figure 2:
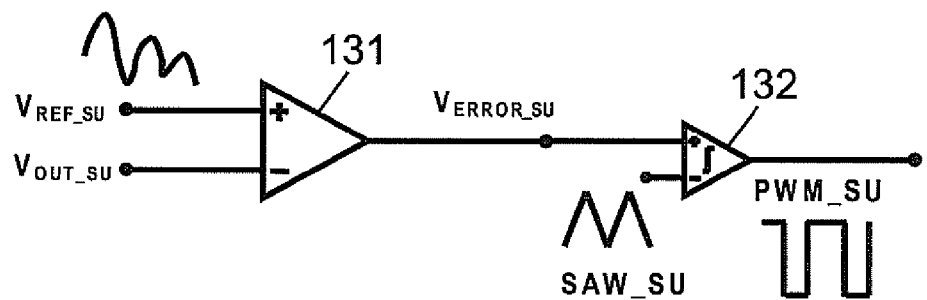
FIG. 2 is a schematic circuit diagram showing means of a Step-Up (or Step-Down) controller used to control stability of the Step-Up (or Step-Down loops, respectively)

FIG. 2 shows a portion of a classic voltage-controlled loop circuitry, which one may think of implementing within the Step-Up controller 13 for generating a pulse-width modulated control signal PWM_SU, from which control signals $\phi_1$ and $\phi_2$, in turn, are generated. As shown in FIG. 2, the Step-Up controller 13 may include an error amplifier 131 receiving the Step-Up reference voltage $V_{REF\_SU}$ and the output voltage $V_{OUT\_SU}$ of the Step-Up converter 10, and issuing an Step-Up error signal $V_{ERROR\_SU}$ based on the difference between these signals. The controller 13 further comprises a comparator 132, receiving the Step-Up error signal $V_{ERROR\_SU}$ on one input terminal and a saw signal SAW_SU on the second input terminal, and outputting the pulse-width modulated control signal PWM_SU.

Figure 3:
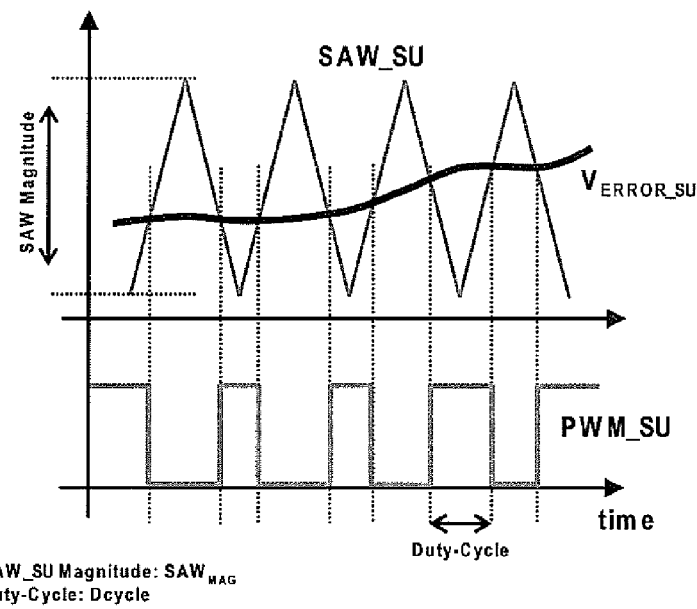
FIG. 3 is a graph showing signals which illustrates the operation of the means of FIG. 2, as a function of time.

FIG. 3 shows graphs, as a function of time, of the Step-Up error signal $V_{ERROR\_SU}$ and of saw signal SAW_SU in the upper part, and the resulting pulse-width modulated control signal PWM_SU in the lower part.

Figure 4:
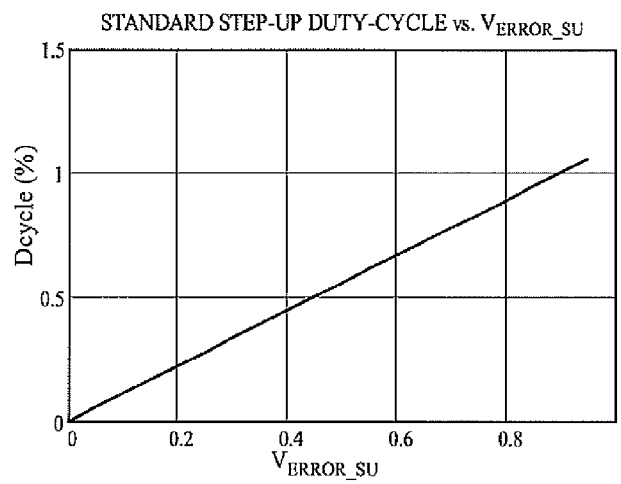
FIG. 4 is a graph of the duty-cycle of pulse-width modulated control signal generated by the Step-Up controller as illustrated by FIG. 2, as a function of the error signal.

FIG. 4 shows the response of the Step-Up stage 10 in terms of its duty cycle as a function of the Step-Up error signal V$_{ERROR\_SU}$. As can be seen, this response is substantially linear.

Figure 5:
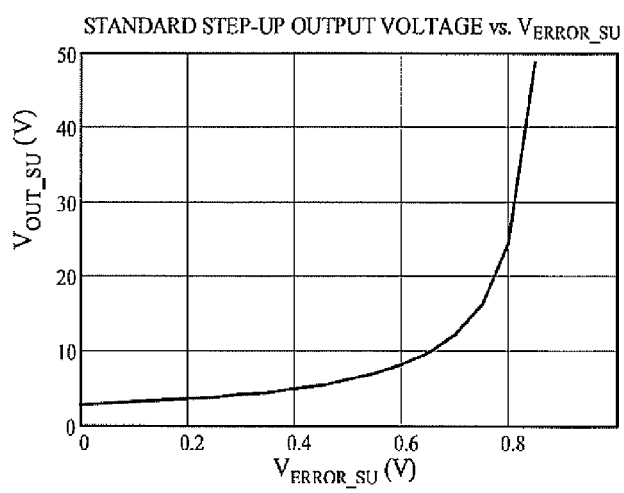
FIG. 5 is a graph of the output voltage of the Step-Up controller as illustrated by FIG. 2, as a function of the error signal.

However, with reference to FIG. 5, it can be seen therein that the response of the Step-Up stage 10 is non-linear versus the Step-Up error signal V$_{ERROR\_SU}$. This can be understood from the following equations describing the Step-Up output voltage V$_{OUT\_SU}$ as a function of the battery voltage V$_{BAT}$, and of magnitude SAW$_{MAG}$ of the saw signal SAW_SU and the duty-cycle D$_{CYCLE}$ of the control signal PWM_SU signal both shown along the vertical axis and the horizontal axis, respectively, of the graph of FIG. 3:

$$SAW_{MAG} = \beta \cdot V_{BAT} \quad \text{(Eq. 1)}$$

$$D_{CYCLE} = \frac{V_{ERROR}}{SAW_{MAG}} \quad \text{(Eq. 2)}$$

$$V_{OUT\_SU} = \frac{V_{BAT}}{1 - D_{CYCLE}} = \frac{V_{BAT}}{1 - \frac{V_{ERROR}}{\beta \cdot V_{BAT}}} \quad \text{(Eq. 3)}$$

wherein $\beta$ is a scaling factor less than unity ($\beta<1$), and SAW$_{MAG}$ magnitude is a scaled image of ideal V$_{BAT}$ (without line transients).

It follows that the output voltage V$_{OUT\_SU}$ of the Step-Up stage 10 increases dramatically, e.g. exponentially, when the error signal V$_{ERROR}$ increases linearly. In other words, the gain of the Step-Up stage is non linear, and becomes higher and higher as the error voltage V$_{ERROR}$ increases. Such non linear behaviour that a simply voltage controlled loop in insufficient to guarantee stability of the Step-Up stage 10 and, hence, of the overall converter circuit.

It results therefrom that the Step-Up controller 13 is designed as a hybrid controller, which operates so as to provide both current and voltage regulation. So the received signal I$_{L\_SU}$ which is representative of the current across the coil Lsu. The generation of the sensed signal I$_{L\_SU}$ requires a current sensor which is not trivial to design, whereby significant complexity is added, and thus die area required by the circuit is increased. Above all, even at the cost of such added complexity of the stabilization means, the stability of the Step-Up converter is not guaranteed for all values of the output voltage V$_{OUT\_SU}$ and current I$_{L\_SU}$.

It shall be appreciated that the Step-Down controller 23, while being less complex to design since the Step-Down stage is easier to stabilize, includes at least components similar to those shown in FIG. 2.

To summarize, the cascaded architecture as shown in FIG. 1, having a SU stage supplying a SD stage in closed loops, exhibits at least the following disadvantages:
- two loops are required, involving two error amplifiers and two comparators, thus yielding in a large die area and high current consumption;
- two reference voltages V$_{REF\_SU}$ and V$_{REF\_SD}$ are needed, thus impacting the pin-off capability of the circuit;
- poor overall efficiency because output voltage V$_{OUT\_SU}$ at output 12 of the SU stage 10 is independent from output voltage V$_{OUT\_SD}$ at output 22 of the SD stage 20; and,
- the Step-Up controller 13 is hard to design, since it must be a hybrid controller having both a current regulation and a voltage regulation to stabilize the loop based on voltage V$_{OUT\_SU}$ and current I$_{L\_SU}$, a current detector being further required in order to sense the current I$_{L\_SU}$ flowing through inductor Lsu of the SU stage 10.

For these reasons, there is proposed another topology for controlling the cascaded architecture, wherein the means for controlling the SU stage 10 and the SD stage 20 have an optimized, partly common circuitry.

Embodiments will now be described with reference firstly to the circuit diagram of FIG. 6.

Figure 6:
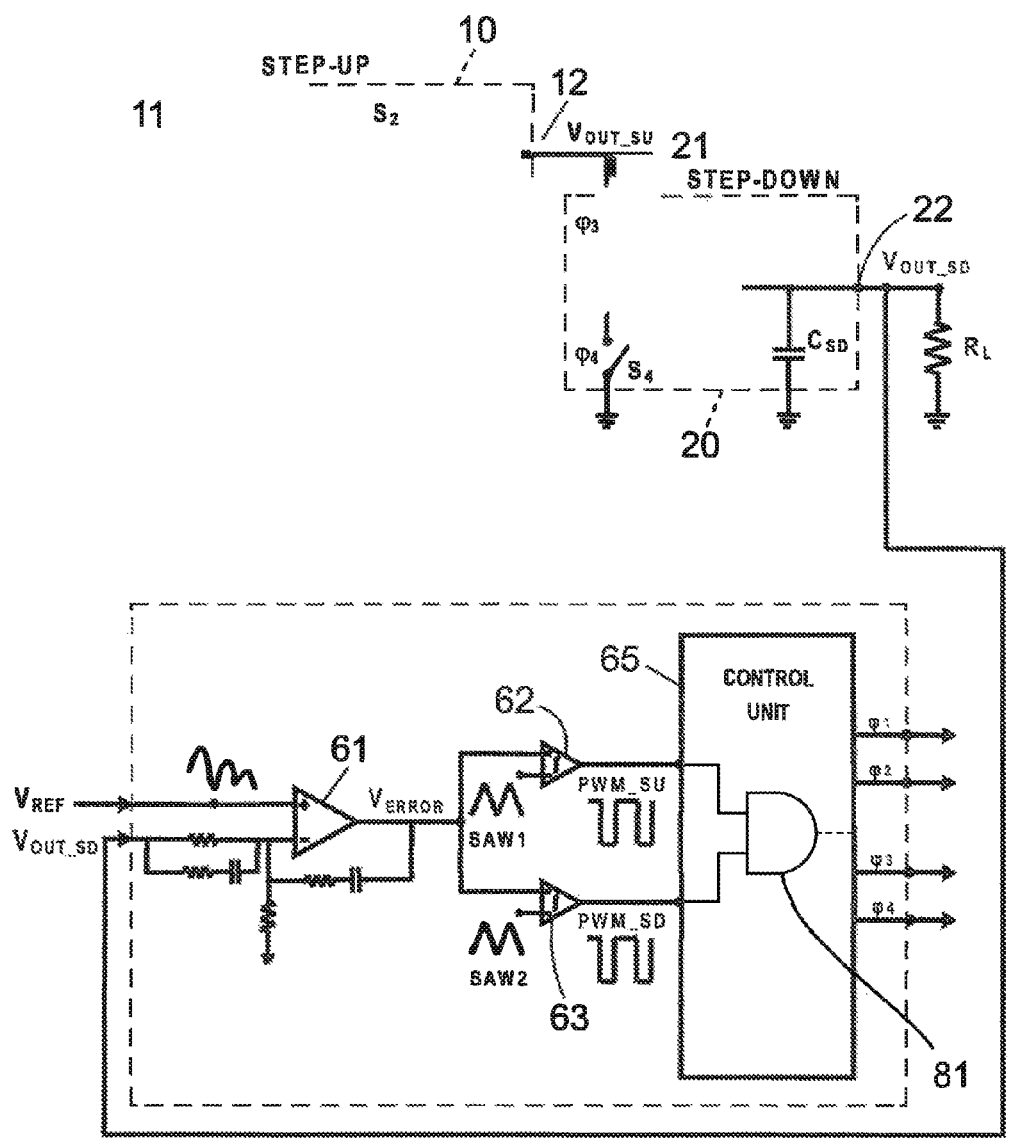
FIG. 6 is a schematic circuit diagram showing embodiments of the DC-DC Step-Down converter.

Embodiments of the proposed DC-DC converter as shown in FIG. 6, have a SU converter 10 supplying a SD converter 20 with its output voltage V$_{OUT\_SU}$, as previously described with reference to FIG. 1. Therefore, description of their components already described above, which bear the same reference numbers, shall not be repeated here.

In contrast, the Step-Up controller 13 for controlling the SU stage 10 and the Step-Down controller 23 for controlling the SD stage 20 as shown in FIG. 1, are replaced by a single Step-Down controller 60 shown in the lower part of FIG. 6.

Step-Down controller 60 comprises an input for receiving a unique reference voltage V$_{REF}$, and a second input for receiving the output voltage V$_{OUT\_SD}$ at output 22 of the SD stage 20. It further comprises a first pair of outputs for outputting the first pair of control signals $\phi_1$ and $\phi_2$, respectively, as well as second pair of outputs for outputting the pair of control signals $\phi_3$ and $\phi_4$, respectively.

The controller 60 comprises a unique error signal generator or error amplifier 61, adapted to generate a single error signal V$_{ERROR}$ from the difference between the output voltage V$_{OUT\_SD}$ of the SD stage 20 and the single reference voltage V$_{REF}$. In the shown embodiment, the error signal generator 61 is implemented based on an operational amplifier in non-inverting mode. It shall be appreciated, however, that the error amplifier may be implemented in any manner suitable for the specific implementation.

The controller 60 further comprises a first comparator 62 and a second comparator 63, each receiving the error signal V$_{ERROR}$ on one input terminal. Comparator 62 receives a first saw signal SAW1 on its second input terminal, and outputs the pulse-width modulated control signal PWM_SU. Comparator 63 receives a second saw signal SAW2 on its second input terminal, and outputs the pulse-width modulated control signal PWM_SD. Comparators 62 and 63 may be implemented in any manner suitable for the specific implementation. Also, the saw signals SAW1 and SAW2 may be generated in any manner suitable for the specific implementation, using one or more saw signal generator, or using a memory table from which digital values of a saw signal are read to generate a digital signal which may be converted to an analog saw signal by a digital-to-analog converter (DAC).

Figure 7:
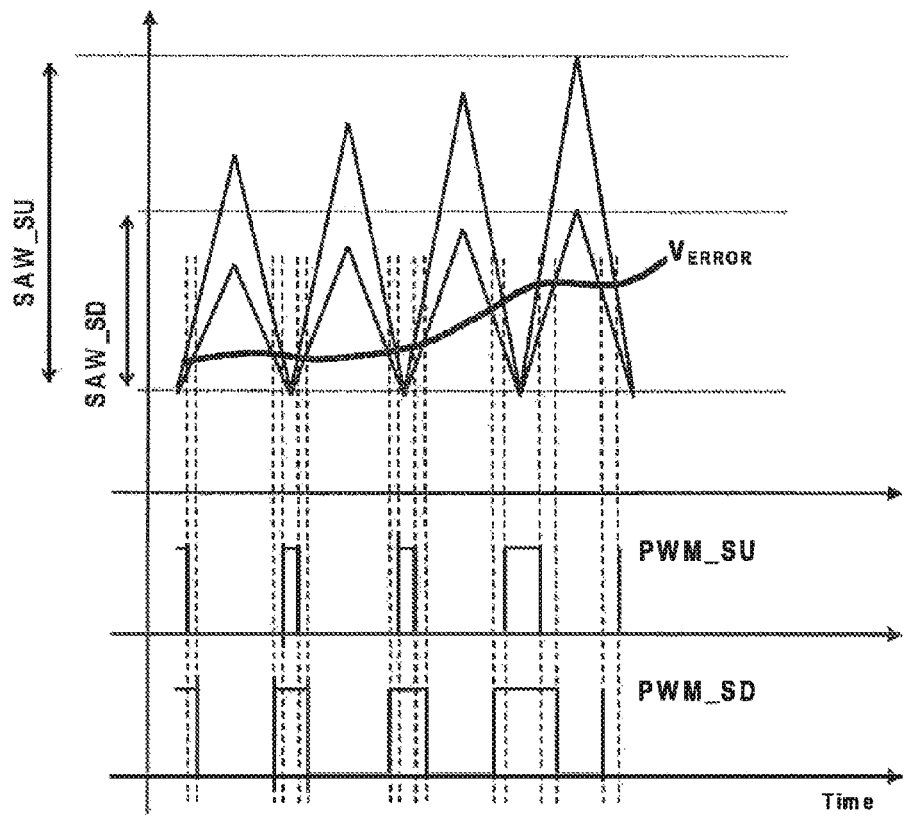
FIG. 7 is a graphical representation of the error signal as compared to first and second saw signals to generate first and second pulse-width modulated control signals, respectively.

FIG. 7 gives a graphical representation of the error signal V$_{ERROR}$ as compared to first saw signals SAW1 and the second saw signals SAW2 to generate first and second pulse-width modulated control signals PWM_SU and PWM_SD, respectively.

Referring back to FIG. 6, the Step-Down controller 60 finally comprises a control unit 65 adapted to generate the first pair of control signals $\phi_1$ and $\phi_2$, and the second pair of control signals $\phi_3$ and $\phi_4$, adapted to control the state ON/OFF of switches S1 and S2 of the Step-Up stage 10, and of switches S3 and S4 of the Step-Down stage 20, respectively. The control unit 65 has a first input and a second input for receiving the first pulse-width modulated control signal SAW_SD and the second pulse-width modulated control signal SAW_SD, respectively.

The control unit 65 is configured to generate the first control signals $\phi_1$ and $\phi_2$, and the second control signals and $\phi_3$ and $\phi_4$, from said signals SAW_SU and SAW_SD, respectively. Again, the detailed description of the operation of the control unit 65, in respect of the two pairs of control signals $\phi_1$, $\phi_2$, and $\phi_3$, $\phi_4$ respectively is not necessary and would go beyond the purpose of the present description. The two couples of control signals $\phi_1$, $\phi_2$, and $\phi_3$, $\phi_4$, are provided at respective outputs of the control unit 65, which correspond to the outputs of the Step-Down controller 60.

It shall be appreciated that the proposed DC-DC converter is configured with one closed loop only, namely with a single loop having a single reference voltage $V_{REF}$. Stated otherwise, the step-down output voltage $V_{OUT\_SD}$ forms the single input to the amplifier circuit 61 which is compared with the single reference voltage $V_{REF}$ by said amplifier circuit 61. The single error signal $V_{ERROR}$ thus generated by the amplifier circuit 61 is compared with the first and second saw signals SAW1 and SAW2 to generate a first pulse-width modulated signal PWM_SU and a second pulse-width modulated signal PWM_SD, respectively. The control unit 65, having two input signals in the form of said first and second pulse-width modulated signals PWM_SU and PWM_SD, generates a first set of control signals $\phi_1$ and $\phi_2$ and a second set of control signals $\phi_3$ and $\phi_4$. These control signals are adapted to control the switching of the Step-Up stage 10 and of the Step-Down stage 20 of the DC-DC converter circuit, respectively.

In other words, with the proposed topology, the DC-DC converter has a master-slave architecture in which only one loop is used to control the Step-Down stage 20. The Step-Up stage 10 is controlled in such a way that it works in a pseudo-open loop through the error signal $V_{ERROR}$ of the Step-Down control loop, which is further compared with the second saw signal SAW2. It results therefrom that the Step-Up stage 10 can have a larger bandwidth, because there is no closed loop control for the Step-Up stage 10. In addition, the Step-Up stage is activated only when needed, that is to say when its output voltage $V_{OUT\_SU}$ which is supplied to the Step-Down stage becomes too low for the output voltage $V_{OUT\_SD}$ of the Step-Down stage 20 to be kept constant due to the step-down loop.

Stated otherwise, the error signal of the step-down control loop is used to control the step-up duty cycle in a master-slave topology such that the Step-Up stage 10 is only activated when required, during the 'regulation' mode. Thus, the circuit is further simplified and power consumption optimised. The step-up output voltage $V_{OUT\_SU}$ and the drop between step-up output voltage $V_{OUT\_SU}$ and step-down output voltage $V_{OUT\_SD}$ may be controlled with the amplitude values of the saw signals SAW1 and SAW2.

The operation of the Step-Down controller of the DC-DC circuit according to embodiments in a so called 'routine' mode and in a so-called 'regulation' mode, will now be described.

In the 'routine' mode of the DC-DC converter, control signals $\phi_1$ and $\phi_2$ cause the switch S1 of the Step-Up stage 10 to remain open (OFF state) and the switch S2 of the Step-Up stage 10 to remain closed (ON state), thus directly connecting $V_{BAT}$ and $V_{OUT\_SU}$. The output of the Step-Up stage 10 is however connected to the input of the Step-Down stage 20, whereby the step-up output voltage $V_{OUT\_SU}$ is supplied to the latter. The error signal $V_{ERROR}$ at the output of the error amplifier 61 is generated by the comparison between step-down reference $V_{REF}$ and step-down output voltage $V_{OUT\_SD}$. Only control signals $\phi_3$ and $\phi_4$ are toggled for activating the Step-Down stage 20 in the closed loop configuration.

Nevertheless, the error signal $V_{ERROR}$ is continuously compared to the first and second saw signals SAW1 and SAW2 to generate pulse-width modulated signals, PWM_SU and PWM_SD, respectively.

In the 'regulation' mode of the step-down converter, the same error signal $V_{ERROR}$ is further used to control the step-up duty cycle and the step-up output voltage $V_{OUT\_SU}$ of the Step-Up stage 10. The latter subsequently supplies the input of the Step-Down stage 20 with an elevated supply voltage as compared to the battery voltage $V_{BAT}$. To that end, the control unit 65 causes toggling of the first pair of control signal $\phi_1$ and $\phi_2$ and the second pair of control signals $\phi_3$ and $\phi_4$ that are received by the Step-Up stage 10 and the Step-Down stage, respectively.

The proposed topology thus allows adding a Step-Up control loop into the closed loop of the Step-Down stage circuit in a master-slave architecture, which proves to be an efficient solution for the stabilisation of both loops.

According to further embodiments, PWM masking may be used to limit the maximum duty cycle for the Step-Up stage. For instance, the controller 60 may be adapted to limit the maximum duty cycle for the Step-Up stage by PWM masking.

Figure 8:
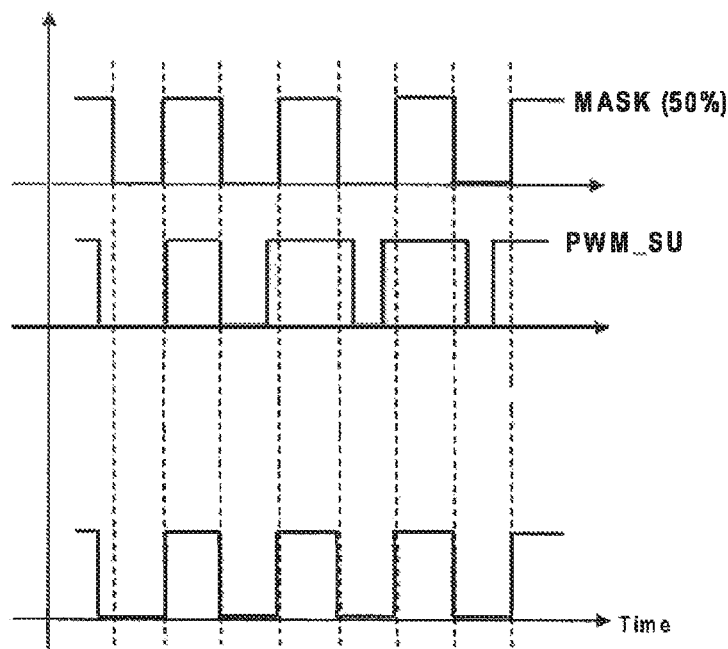
FIG. 8 is a graphical representation of a masking technique according to a second embodiment of the present invention.

As shown schematically in FIG. 8, an AND gate 81 or similar logic which may for instance be comprised inside controller 60, may be controlled by signal PWM_SU and by an external masking signal MASK with the same frequency as PWM_SU. A desirable percentage is selected for the step-up duty cycle and the maximum value of the pulse width modulation cycle of signal PWM_SU is clamped to said selected percentage. In the shown example, the duty-cycle of the signal MASK is 50%, so that the duty-cycle of the signal output by the AND gate 81 is clamped to 50%, as can be seen in the lower part of FIG. 8.

Step-Up Stage Transfer Function linearization

As already mentioned above in respect of equations Eq.1 to Eq.3, the step-up response is non-linear versus the error signal.

Embodiments of the proposed topology, however, allow a more linear response to be obtained by making the magnitude SAW$_{MAG}$ of the first saw wave SAW1 proportional to the step-up output voltage $V_{OUT\_SU}$ in order to generate a desired PWM signal. This gives:

$$SAW_{MAG} = \beta \cdot V_{OUT\_SU} \qquad (Eq.4)$$

wherein $\beta$ is a scaling factor less than unity ($\beta<1$) and SAW$_{MAG}$ is the magnitude of the SAW_SU signal, which is a scaled image of the output voltage $V_{OUT\_SU}$ of the Step-Up stage 10.

The linear response may be calculated using equations Eq.2 and Eq.3 given above:

$$D_{CYCLE} = \frac{V_{ERROR}}{SAW_{MAG}} = \frac{V_{ERROR}}{\beta \cdot V_{OUT\_SU}} \qquad (Eq. 5)$$

$$V_{OUT\_SU} = \frac{V_{BAT}}{1 - D_{CYCLE}} = \frac{V_{ERROR}}{\beta} + V_{BAT} \qquad (Eq. 6)$$

Figure 9:
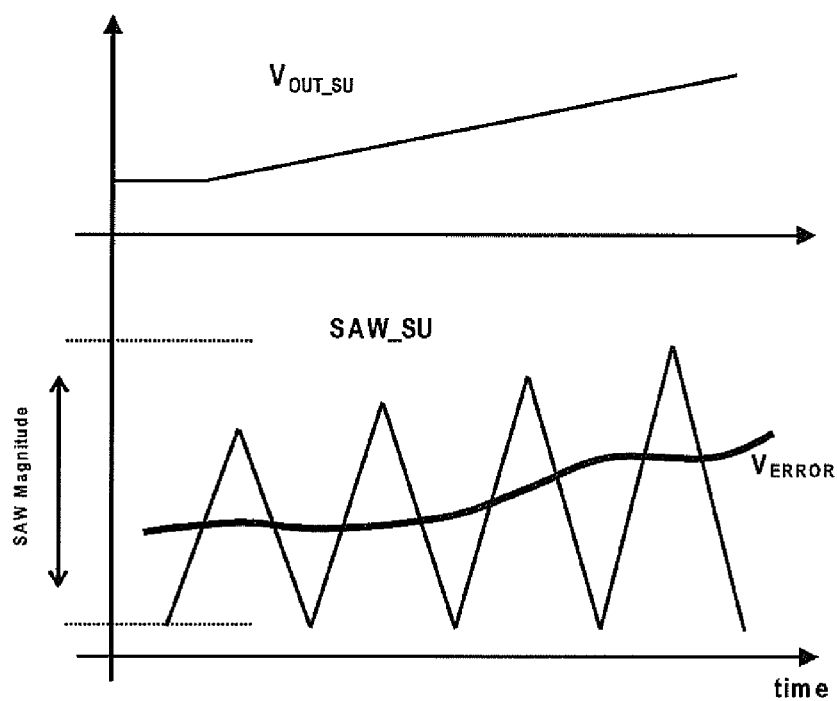
FIGS. 9 and 10 are graphs illustrating provision of a first linearization technique.
Figure 10:
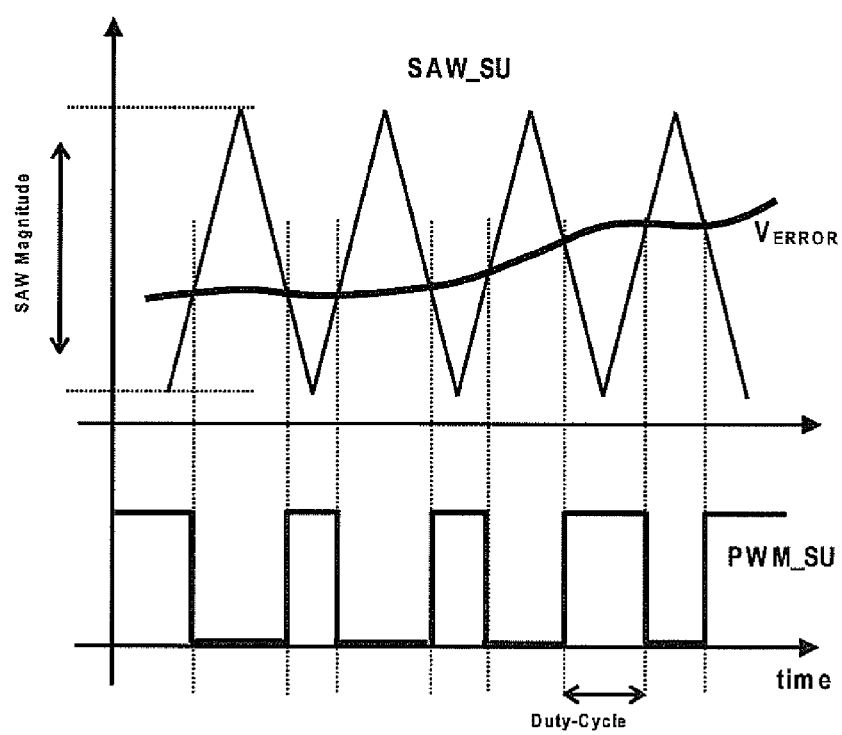

FIGS. 9 and 10 show the magnitude SAW$_{MAG}$ of SAW_SU as a scaled equivalent of the step-up output voltage $V_{OUT\_SU}$ and of the duty-cycle of signal PWM_SU, respectively that is in line with Eq.5 and Eq.6, respectively, as given above.

By putting Eq. 6 into Eq. 5, it becomes:

$$D_{CYCLE} = \frac{V_{ERROR}}{V_{ERROR} + \beta \cdot V_{BAT}} \quad \text{(Eq. 7)}$$

Figure 11:
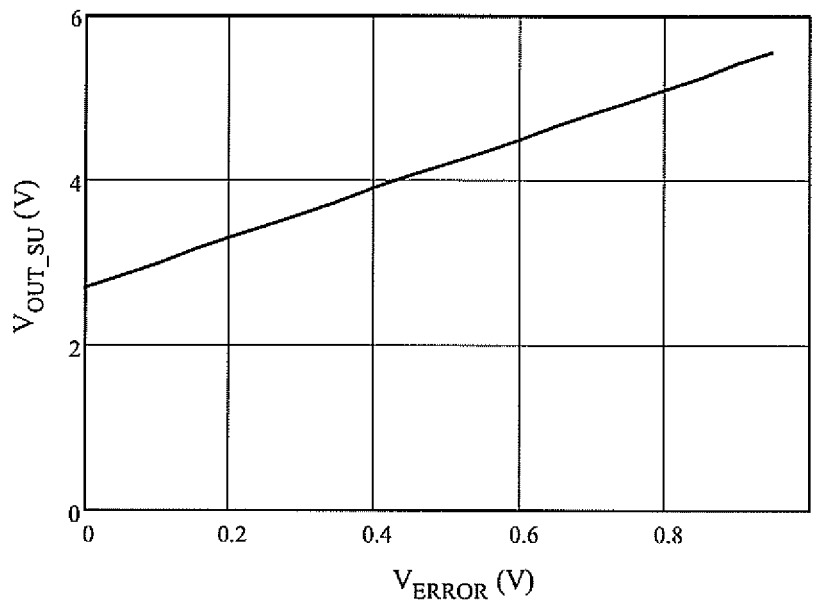
FIG. 11 show a graphical representation of linearized step-up output versus error signal.
Figure 12:
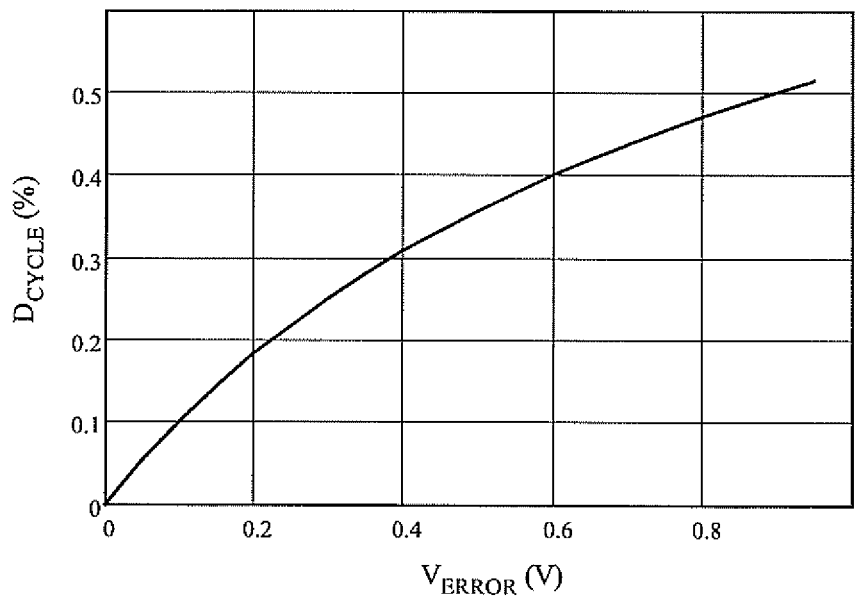
FIG. 12 is a graphical representation of linearized step-up duty cycle versus error signal.

As can be seen in FIGS. 11 and 12, the resulting output voltage V$_{OUT\_SD}$ is a linear function of error voltage V$_{ERROR}$ whereas the duty cycle D$_{CYCLE}$ is non-linear versus the error voltage V$_{ERROR}$.

Figure 13:
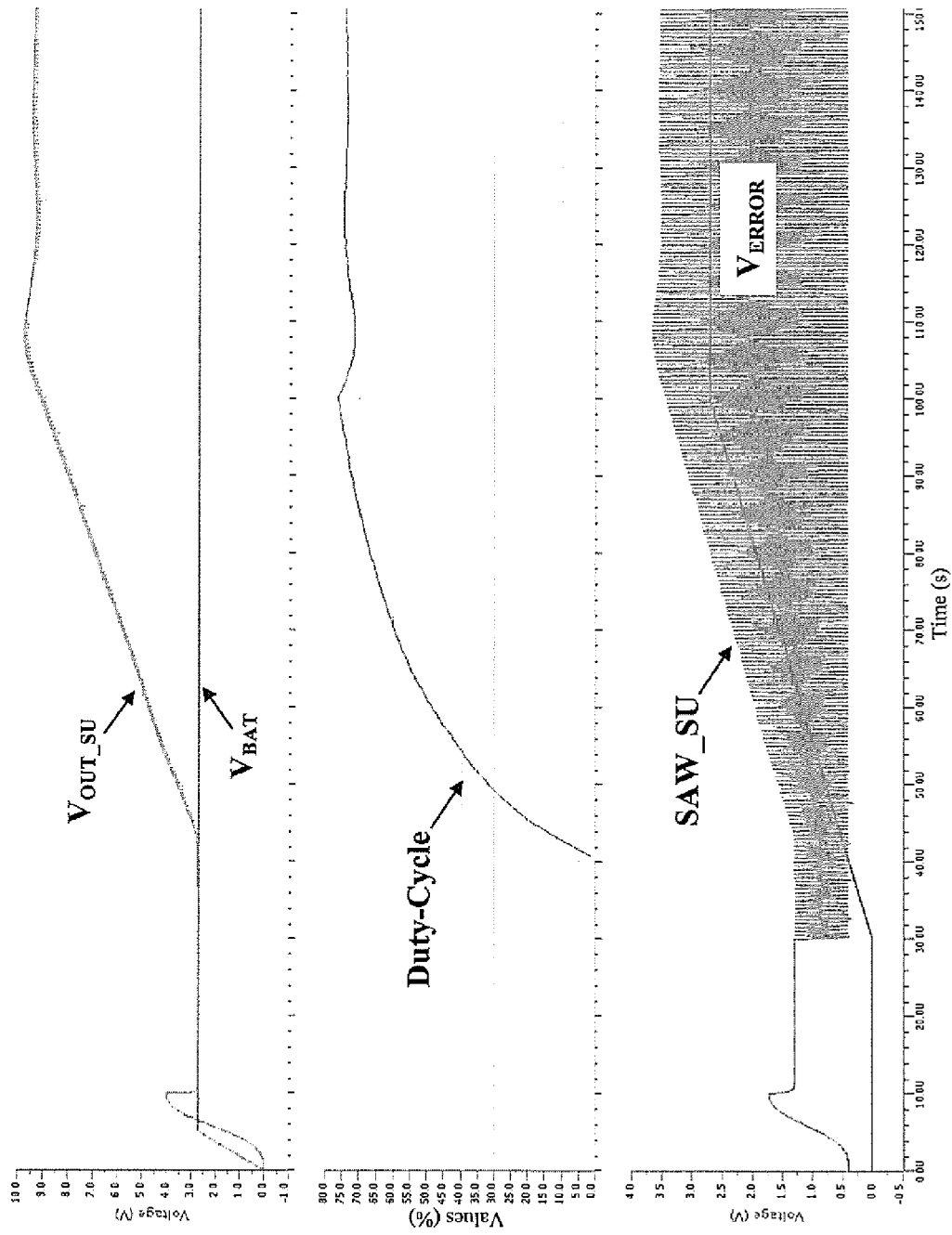
FIG. 13 is a graphical representation of simulation results for the linearization technique as per FIGS. 9 to 12.

The graphs of FIG. 13 show simulation results for step-up linearisation in an open loop mode using the following parameter setup:
V$_{BAT}$=2.7 Volts (V)
I$_{OUT}$=250 milli-amperes (mA)
β=⅓
C$_{OUT\_SU}$=4.7 micro-Farads (μF)
L$_{SU}$=1 micro-Henry (μH)
Switching frequency: 2 mega-Hertz (MHz)

The upper graph in FIG. 13 shows the step-up output voltage V$_{OUT}$_SU and the battery voltage V$_{BAT}$ as a function of time. The middle graph shows the duty-cycle D$_{CYCLE}$ of the PWM control signal PWM_SU as a function of time. Finally, the lower graph shows the magnitude SAW$_{MAG}$ of the saw signal SAW1 and the error voltage V$_{ERROR}$ as a function of time.

Line Transient Compensation for the Output Voltage of the Step-Up Stage

According to further embodiments will now be described. The actual real behaviour of an integrated Step-Up converter can be summarized with the following assumptions:
Battery does not have a O Ohm output impedance Z$_{OUT}$;
Either the Step-Up converter or another Integrated Circuit (IC) connected to the battery may exhibit an increased current consumption during a short time period;
During such time periods, the battery voltage decreases abruptly by ΔV$_{BAT}$=I$_{BAT}$×Z$_{OUT}$.

Figure 14:
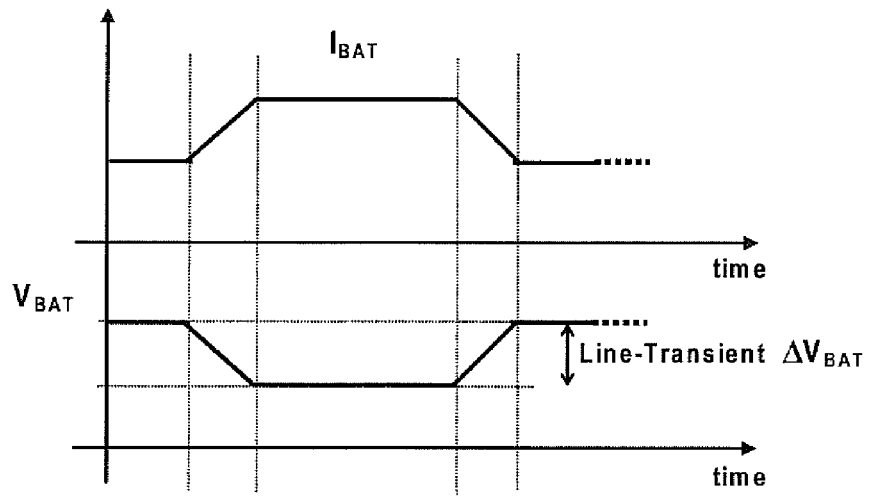
FIG. 14 is a graphical representation of the effect of line-transient compensation on PWM_SU.

In an integrated step-up converter in a circuit having an input from a battery with an output impedance greater than zero, the battery voltage decreasing abruptly as the Integrated Circuit abruptly increases current consumption during a short period, as per FIG. 14.

The resulting transfer function of the linearized step-up stage is:

$$V_{OUT\_SU} = \frac{V_{ERROR}}{\beta} + V_{BAT} - \Delta V_{BAT}(t) \quad \text{(Eq. 8)}$$

which shows that the Step-Up output varies as a function of Line-Transient ΔV$_{BAT}$(t).

In order to enhance stability of the step-up output voltage V$_{OUT\_SU}$, a line-transient compensation may be further added to the Step-Up stage 10. Indeed, embodiments may provide means for controlling the offset of the first saw signal SAW1 such that the minimum voltage value SAW$_{SU,MIN}$ of said first saw signal SAW1 is proportional to the input voltage V$_{BAT}$. Thus, the output voltage of the Step-Up stage 10 is rendered independent from, or at least much less dependent from, the Line-Transient ΔV$_{BAT}$ whereas the duty-cycle of PWM_SU becomes dependent on line-transient.

Ordinarily, step-up output varies as a function of line-transient, namely of unwanted variations ΔV$_{BAT}$ of the battery voltage V$_{BAT}$. In the proposed embodiments the output voltage V$_{OUT\_SU}$ of the Step-Up stage becomes independent of such line transient as a result of making the minimum voltage SAW$_{SU,MIN}$ of first saw signal SAW1 proportional to the battery voltage V$_{BAT}$. The step-up duty-cycle D$_{CYCLE}$ is compensated, and is thus independent of line transient on V$_{BAT}$, whereby maintaining the step-up output voltage V$_{OUT\_SU}$ at a constant value as battery voltage decreases.

Having the SAW1 minimum voltage SAW$_{SU,MIN}$ proportional to V$_{BAT}$, which may be expressed as follows:

$$SAW_{SU,MIN} = \beta \cdot V_{BAT} \quad \text{(Eq.9)}$$

It follows that, when a line transient appears, the conditions change to:

$$SAW_{SU,MIN} = \beta \cdot [V_{BAT} - \Delta V_{BAT}(t)] \quad \text{(Eq.10)}$$

Figure 15:
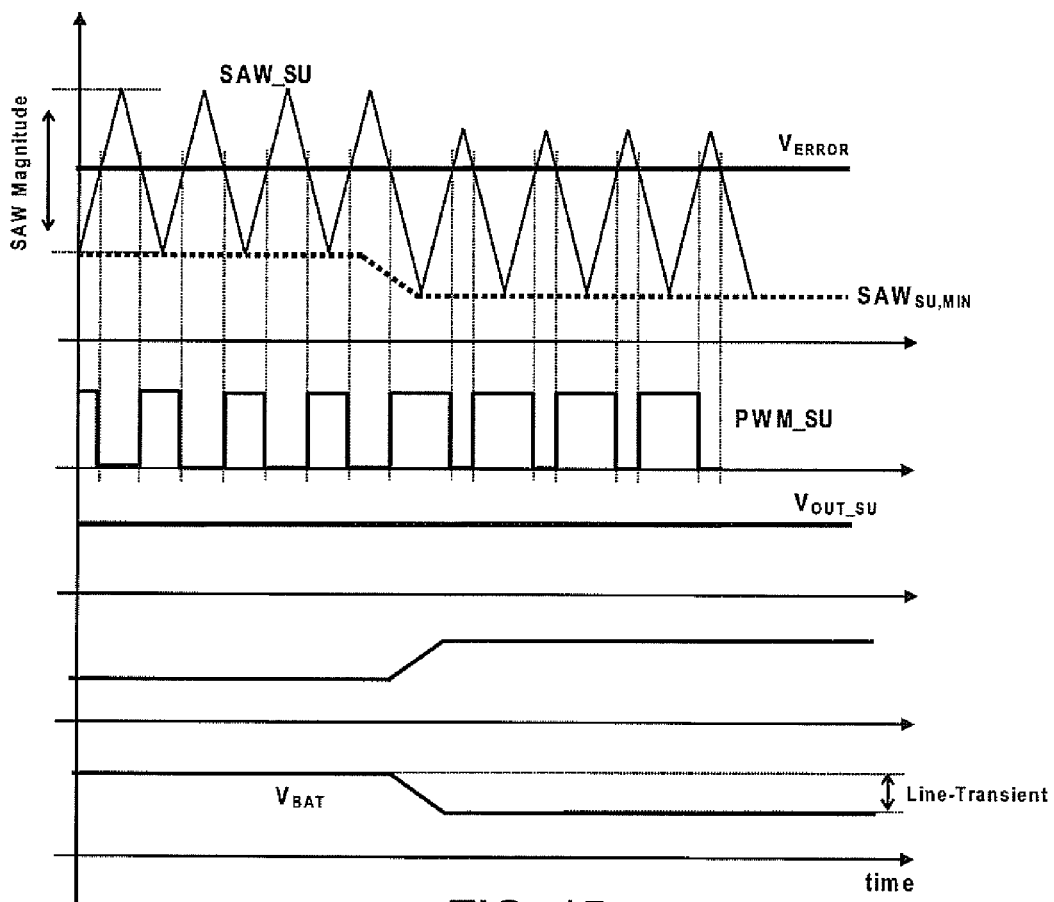
FIG. 15 is a graph illustrating provision of a second linearization technique, that is a graphical representation of step-up output as a function of line-transient under compensation conditions.

As shown at the top of FIG. 15, a shift on SAW_SU which decreases the minimum voltage SAW$_{SU,MIN}$ of the saw signal SAW1 can also be seen as an offset on the error voltage V$_{ERROR}$, which increases said error voltage. As can be seen by the following equation, the effect on the PWM control signal PWM_SU is:

$$D_{CYCLE} = \frac{V_{ERROR} + \beta \cdot \Delta V_{BAT}(t)}{SAW_{MAG}} \quad \text{(Eq. 11)}$$

$$V_{OUT\_SU} = \frac{V_{BAT} - \Delta V_{BAT}(t)}{1 - D_{CYCLE}} \quad \text{(Eq. 12)}$$

The step-up output voltage V$_{OUT\_SU}$ therefore becomes independent from line transient:

$$V_{OUT\_SU} = \frac{V_{ERROR}}{\beta} + V_{BAT} \quad \text{(Eq. 13)}$$

whereas the duty-cycle becomes dependent on line transient such that:

$$D_{CYCLE} = \frac{V_{ERROR} + \beta \cdot \Delta V_{BAT}(t)}{V_{ERROR} + \beta \cdot V_{BAT}} \quad \text{(Eq. 14)}$$

Figure 16:
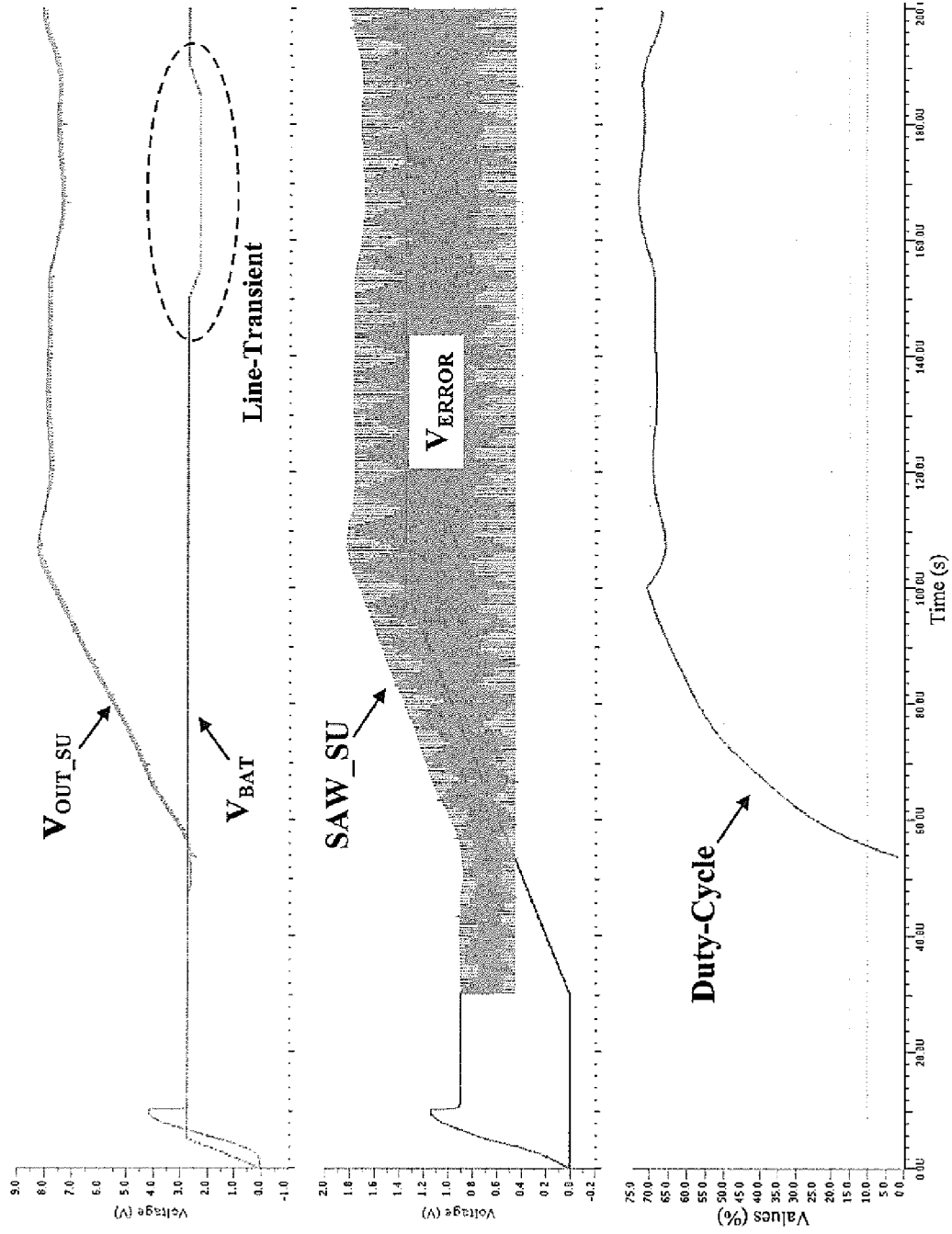
FIG. 16 is a graphical representation of line-transient compensation simulation results showing the relationship of VBAT and Step-Up output voltage without line-transient compensation.
Figure 17:
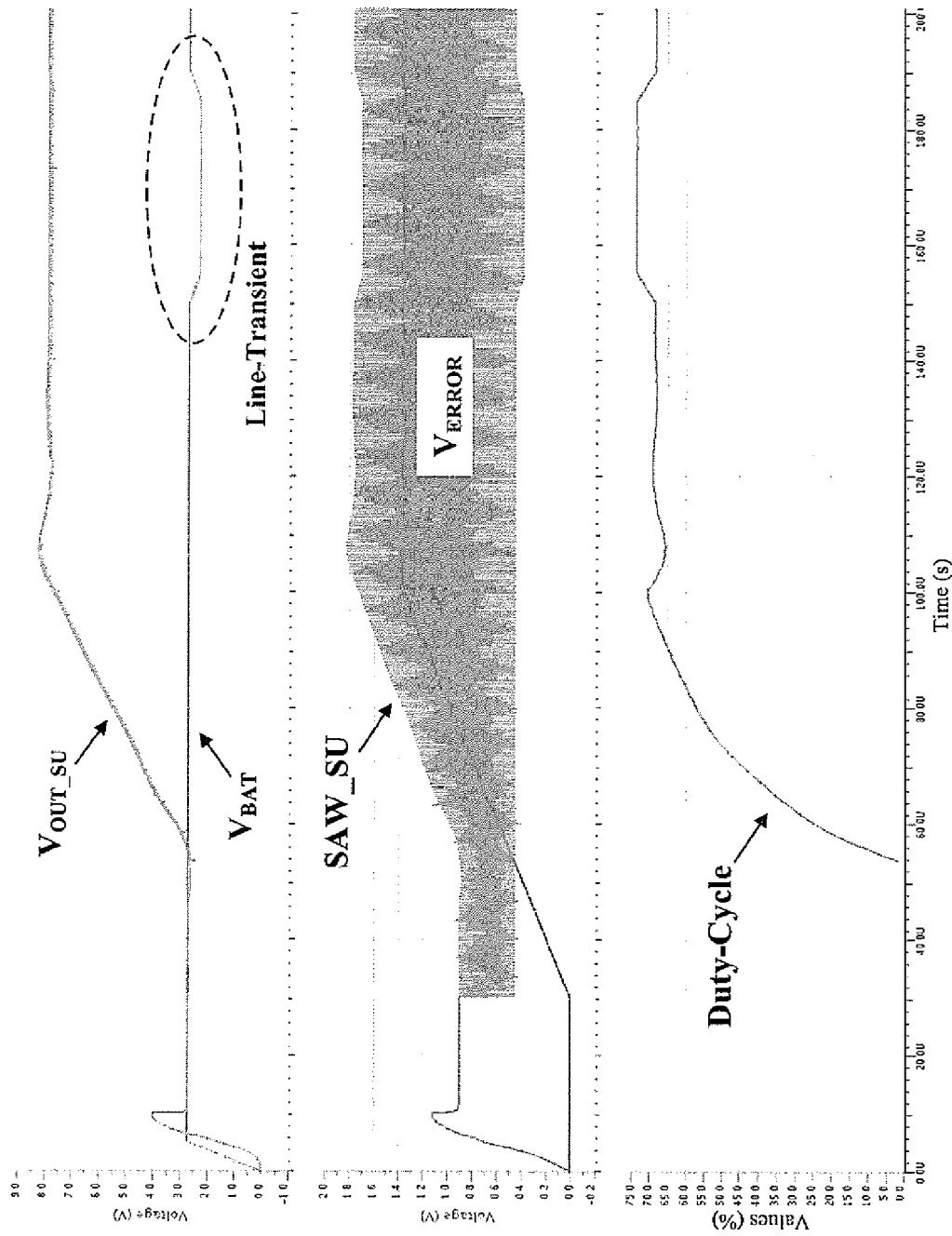
FIG. 17, is a graphical representation of line-transient compensation simulation results showing the relationship of VBAT and Step-Up output voltage with line-transient compensation.

FIGS. 16 and 17, which depict the same signals and voltages as FIG. 13 described above, show simulation results in open loop mode. These simulation results for line-transient compensation have been obtained using the following parameter setup:
V$_{BAT}$=2.7 Volts (V)
I$_{OUT}$=250 milli-amperes (mA)
β=⅙₆
C$_{OUT\_SU}$=4.7 micro-Farads (μF)
L$_{SU}$=1 micro-Henry (μH)
Switching frequency: 2 mega-Hertz (MHz)

The upper graph in FIGS. 16 and 17 shows the step-up output voltage V$_{OUT\_SD}$ and the battery voltage V$_{BAT}$ as a function of time. The middle graph shows the magnitude SAW$_{MAG}$ of the saw signal SAW1 and the error voltage V$_{ERROR}$ as a function of time. Finally, the lower graph shows the duty-cycle D$_{CYCLE}$ of the PWM control signal PWM_SU as a function of time.

The result illustrated by FIG. 16 is that, without line transient compensation, when V$_{BAT}$ decreases the Step-Up output voltage V$_{OUT\_SU}$ decreases following the line transient ΔV$_{BAT}$, whereas, as shown in FIG. 17, V$_{OUT\_SU}$ is kept constant when V$_{BAT}$ decreases and line transient compensation is used.

Mathematical Expression for the Output Voltage of the Step-Up Stage as a Function of the Output Voltage of the Step-Down Stage It shall now be provided a mathematical expression for the output voltage $V_{OUT\_SU}$ of the Step-Up stage 10 as a function of the output voltage $V_{OUT\_SD}$ of the Step-Down stage 20.

The input voltage of the Step-Down stage is the step-up output voltage $V_{OUT\_SU}$, which is proportional to the magnitude $SAW_{MAG\_SD}$ of the second saw signal signal SAW2 such that:

$$SAW_{MAG\_SD} = \alpha \cdot V_{OUT\_SU} \qquad (\text{Eq.16})$$

wherein the constant $\alpha$ is less than unity ($\alpha < 1$).

The step-down phase utilises a known "feed forward" technique to compensate Step-Down line transients (VOUT_SD variations versus VOUT_SU variations).

The duty cycle of the Step-Down stage is described by:

$$D_{SD} = \frac{V_{ERROR}}{SAW_{MAG\_SD}} \qquad (\text{Eq. 15})$$

wherein the output voltage $V_{OUT\_SD}$ is proportional to the Duty-Cycle and the input voltage $V_{OUT\_SU}$:

$$V_{OUT\_SD} = D_{SD} \cdot V_{OUT\_SU} \qquad (\text{Eq.17})$$

If the step-down stage of the circuit is in 'regulation' mode, the error signal $V_{ERROR}$ is generated by the comparison between the single reference voltage and the step-down voltage output $V_{OUT\_SD}$ to control the Step-Up duty-cycle and the output voltage such that:

$$V_{ERROR} = \alpha \cdot V_{OUT\_SD} \qquad (\text{Eq.18})$$

The equation for the Step-Up duty-cycle $D_{SU}$ thus becomes:

$$D_{SU} = \frac{V_{ERROR} + \text{Offset}}{SAW_{MAG\_SU}} \qquad (\text{Eq. 19})$$

wherein Offset is a positive value that represents the difference between the average value of SAW_SD and the average of SAW_SU.

The magnitude of SAW_SU and the step-up output voltage $V_{OUT\_SU}$ are then calculated using the same linearization method as described above:

$$SAW_{MAG\_SU} = \beta \cdot V_{OUT\_SU} \qquad (\text{Eq. 20})$$

$$V_{OUT\_SU} = \frac{V_{ERROR} + \text{Offset}}{\beta} + V_{BAT} \qquad (\text{Eq. 21})$$

The step-up output voltage $V_{OUT\_SU}$ as a function of Vout_sd is demonstrated by using Eq.18 in Eq.21:

$$V_{OUT\_SU} = \frac{\alpha \cdot V_{OUT\_SU} + \text{Offset}}{\beta} + V_{BAT} \qquad (\text{Eq. 22})$$

Figure 18:
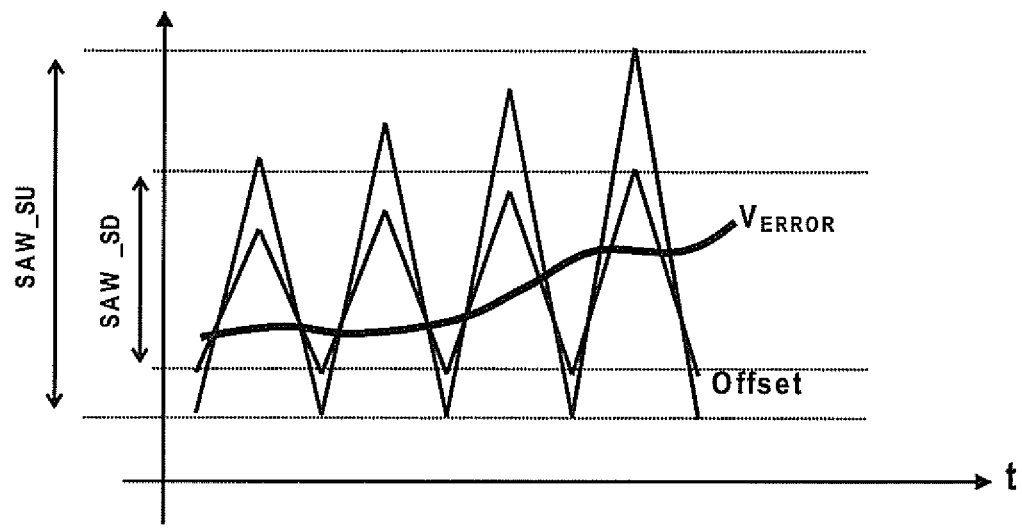
FIG. 18 is a graphical representation of the tuning of the magnitude and average values of first and second saw signals of FIG. 6.

As already mentioned before, both the magnitude and average values of first and second saw signals SAW1 and SAW2 can be tuned in order to manage the duty cycle of the PWM signals PWM_SU and PWM_SD, respectively. This tuning is illustrated by the graph of FIG. 18.

Mathematical Simulation

Figure 19:
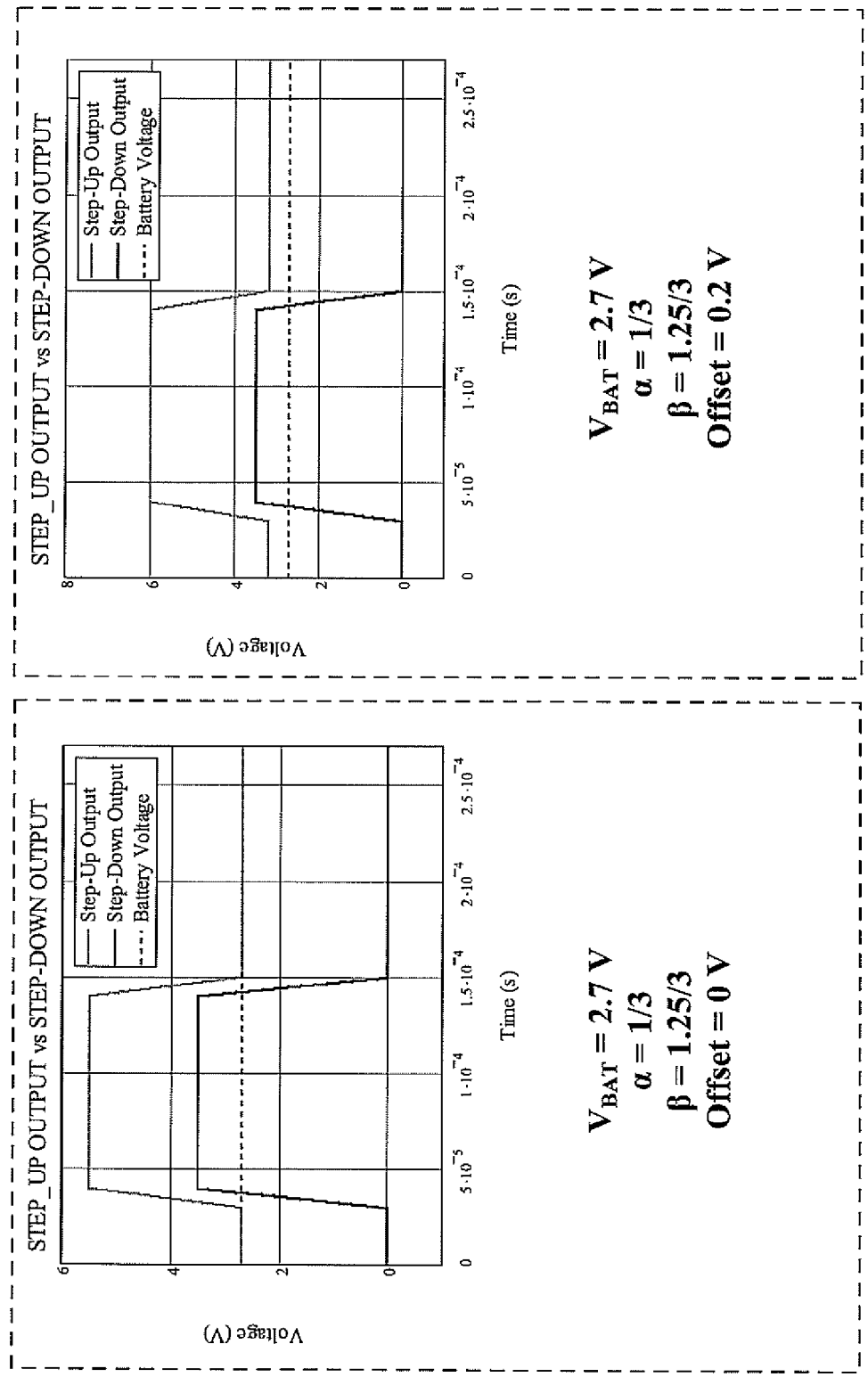
FIG. 19 is a graphical representation of a mathematical simulation wherein the step-up output voltage is a function of the step-down output voltage.
Figure 20:
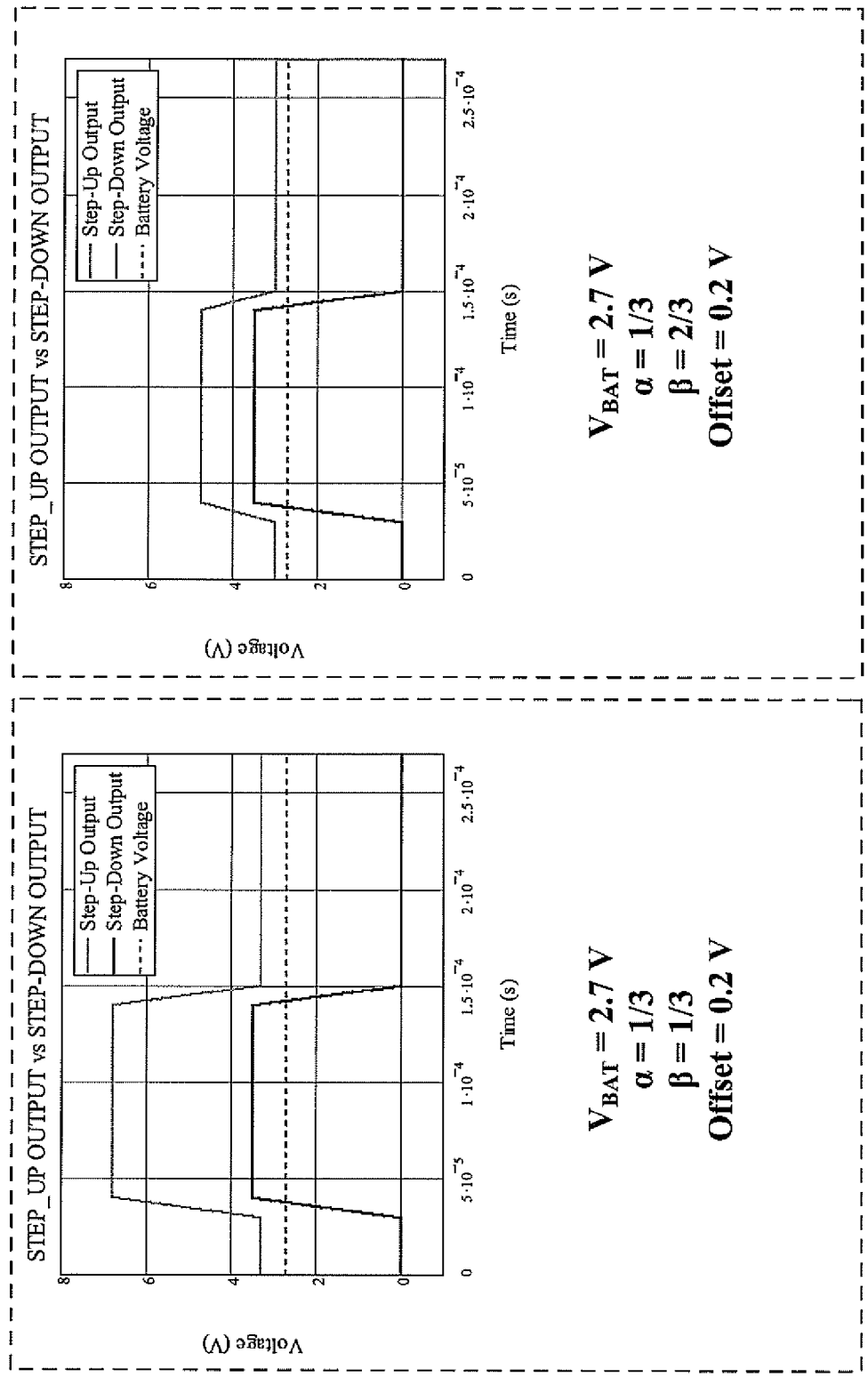
FIG. 20 is a graphical representation of a further mathematical simulation wherein the step-up output voltage is a function of the step-down output voltage.
Figure 21:
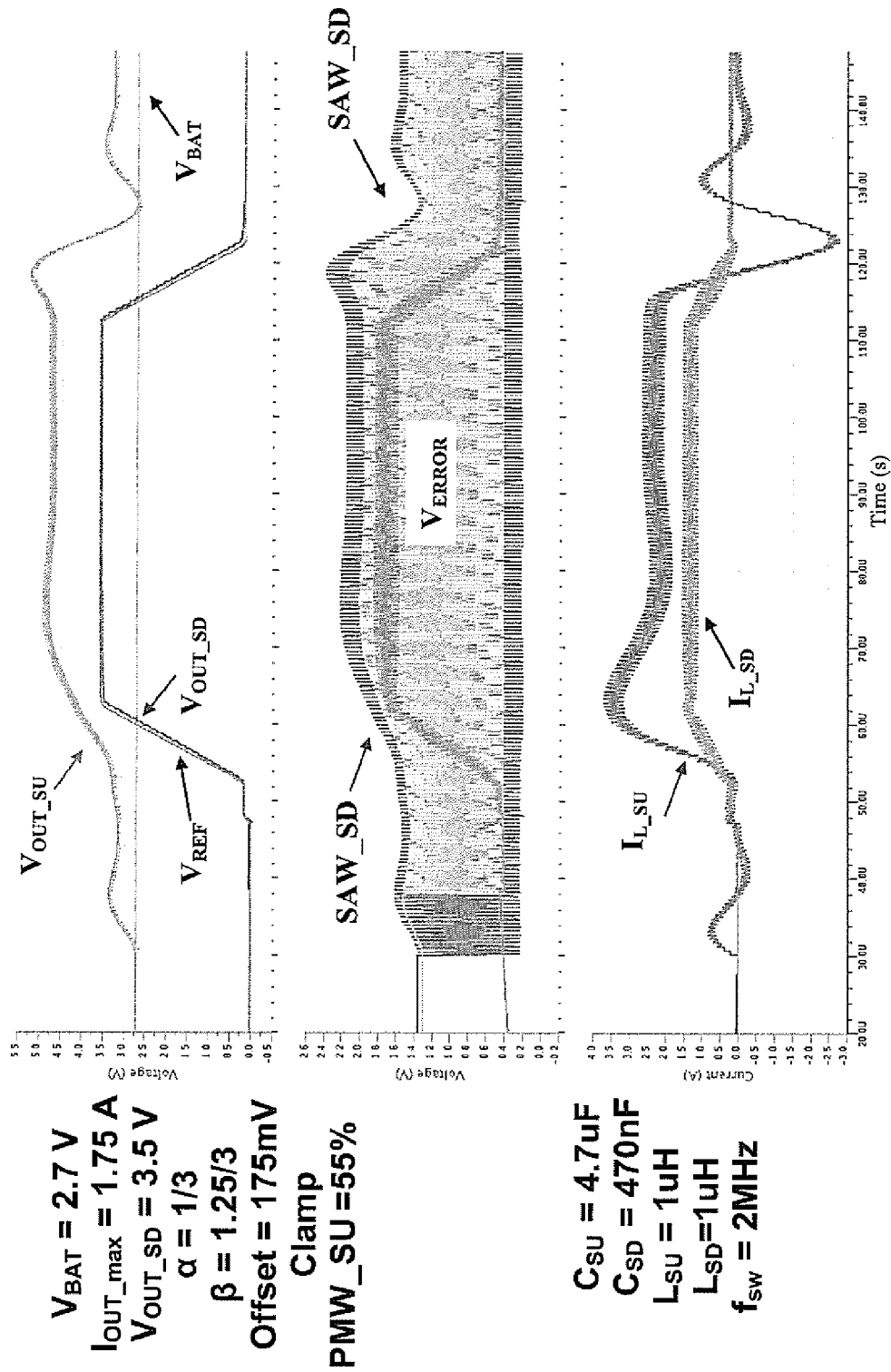
FIG. 21 is a graphical representation of the results of an electrical simulation in which the step-down converter controls the step-up converter for Vbat=2.7V at 55% of step-up duty cycle.
Figure 22:
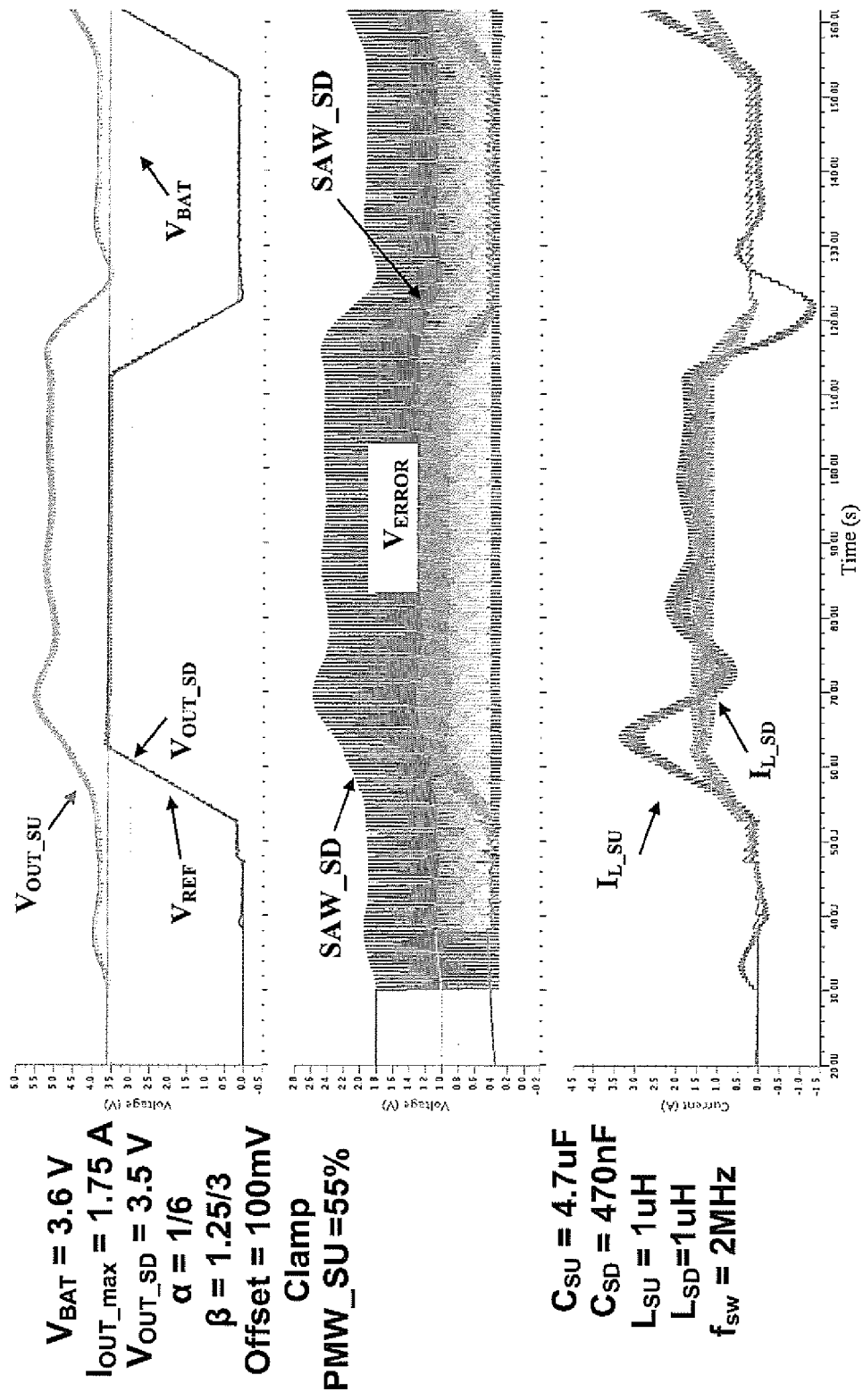
FIG. 22 is a graphical representation of the results of an electrical simulation in which the step-down converter controls the step-up converter for Vbat=3.6V at 55% of step-up duty cycle; and, FIG. 23 is a block diagram of a portable electronic device embodying the DC-DC converter as per FIG. 6.

FIG. 19 shows a mathematical simulation wherein VOUT_SU is a function of VOUT_SD for Offset=0V and Offset=0.2V. FIG. 20 shows a further simulation in which VOUT_SU vs. VOUT_SD for $\beta = 1/3$ and $\beta = 2/3$.

Electrical Simulation

Figure 23:
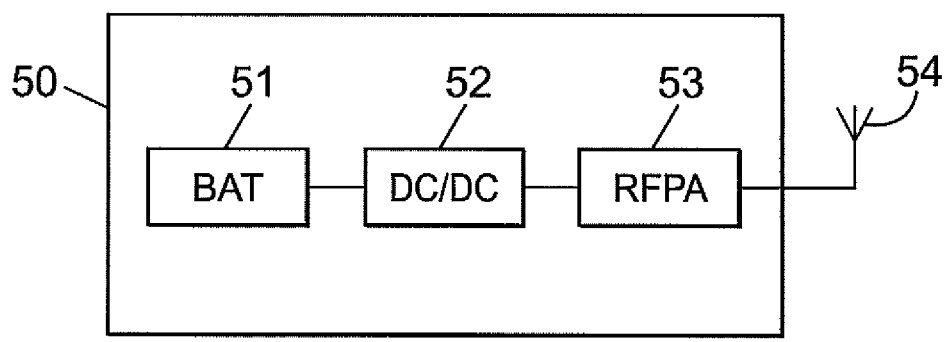

FIGS. 23 and 24 show electrical simulation of the step-down converter controlling the step-up converter for VBAT=2.7V and VBAT=3.6V, at 55% of step-up duty cycle. It can be seen that $V_{OUT\_SU}$ follows $V_{OUT\_SD}$ without the need for an additional loop.

Example of Application

With reference to FIG. 25, another aspect relates to a portable electronic device 50, such as a mobile phone for instance, which comprises:
- a battery 51 adapted to provide a battery voltage $V_{BAT}$;
- DC-DC converter 52 adapted to generate a supply voltage from the battery voltage, higher than said battery voltage; and,
- a Radio-Frequency Power Amplifier (RFPA) module 53 powered by the supply voltage.

The RFPA module 53 may drive an antenna 54, which may be an external antenna as in the shown example. As the RFPA module is one of the most power consuming components of such portable electronic devices, the DC-DC converter may advantageously have the cascaded topology which has been described above. The input of the RFPA module 53 is thus connected to the output of the Step-Down stage 20 of the DC-DC converter 52. Such a solution may provide high efficiency for a wide range of conversion ratios. In particular, this modular architecture is suitable for providing modulation with the correct bandwidth and spurious attenuation.

In such an embodiment of the present invention, a DC-DC converter has a cascaded architecture with a step-up converter supplying a step-down converter in a single loop, the output of the step-down converter connecting to the RFPA. In such application, the proposed DC-DC converter with cascaded Step-Up stage and Step-Down stage allows circumventing the high output ripple and low bandwidth of the Step-Up stage supplying the Step-Down stage, which, when employed in isolation, produces low output ripple and high bandwidth.

In some applications where the output voltage is amplitude modulated, provision can be made for a quickly changing voltage regulating scheme for controlling the Step-Down stage based on the known "envelope tracking" technique, to save power from the battery by reducing the supply voltage actually used for driving the power amplifier. Indeed, in RF power amplifiers, efficiency varies with the RF signal amplitude. Usually the yield is maximal at full power and drops rapidly when the amplitude of the RF signal decreases as a larger part of the supply voltage is not used and is thus dissipated in transistors. Known regulated Step-Down converters partly compensate for this drawback by tracking the signal amplitude with an efficient power supply modulator having a quick response.

Expressions such as "comprise", "include", "incorporate", "contain", "is" and "have" are to be construed in a non-exclusive manner when interpreting the description and its associated claims, to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance legibility.

The invention claimed is:

1. A DC-DC converter, comprising:
an input terminal configured to receive an input voltage;
a Step-Up stage having a step-up stage input connected to the input terminal to receive the input voltage, and a step-up stage output, said Step-Up stage including a plurality of switches therein;
a Step-Down stage having a step-down stage input coupled to the step-up stage output and a step-down stage output, said Step-Down stage including a plurality of switches therein, said Step-Up stage and Step-Down stage being controlled by a first set of control signals and by a second set of control signals, respectively;
an output terminal connected to the step-down stage output so as to receive an output voltage of said Step-Down stage to drive a load coupled to said output terminal; and,
a controller configured to generate the first set of control signals and the second set of control signals, said controller comprising
a single error signal generator configured to generate a single error signal from a difference between a voltage at the step-down stage output and a single reference voltage, and to generate both the first set of control signals and the second set of control signals from said error signal, each one of the first set of control signals being directly and uniquely connected to one of the plurality of switches in the Step-Up stage, and each one of the second set of control signals being directly and uniquely connected to one of the plurality of switches in the Step-Down stage,
a first comparator configured to generate a first pulse-width modulated, PWM, control signal based on a comparison of the error signal with a first saw signal,
a second comparator configured to generate a second PWM control signal based on a comparison of the error signal with a second saw signal that is different from the first saw signal, and,
a control unit configured to generate the first control signals and the second control signals based on the first PWM control signal and the second PWM control signal, respectively,
wherein the controller is configured to control a magnitude of the first saw signal to be proportional to a voltage at the step-up stage output.

2. The DC-DC converter of claim 1, wherein the step-down stage input is directly connected to the step-up stage output.

3. The DC-DC converter of claim 1, wherein, in a first mode of operation, the controller is adapted to cause the first control signals and the second control signals to toggle so that the Step-Up stage and the Step-Down stage are simultaneously activated.

4. The DC-DC converter of claim 1, wherein in a second mode of operation, the controller is configured to cause only the first control signals, not the second control signals to toggle so that only the Step-Down stage is activated.

5. The DC-DC converter of claim 1, wherein the controller is configured to limit a maximum duty cycle for the Step-Up stage by pulse-width modulated, PWM, masking.

6. A DC-DC converter, comprising:
an input terminal configured to receive an input voltage;
a Step-Up stage having a step-up stage input connected to the input terminal to receive the input voltage, and a step-up stage output, said Step-Up stage including a plurality of switches therein;
a Step-Down stage having a step-down stage input coupled to the step-up stage output and a step-down stage output, said Step-Down stage including a plurality of switches therein, said Step-Up stage and Step-Down stage being controlled by a first set of control signals and by a second set of control signals, respectively;
an output terminal connected to the step-down stage output so as to receive an output voltage of said Step-Down stage to drive a load coupled to said output terminal; and,
a controller configured to generate the first set of control signals and the second set of control signals, said controller comprising
a single error signal generator configured to generate a single error signal from a difference between a voltage at the step-down stage output and a single reference voltage, and to generate both the first set of control signals and the second set of control signals from said error signal, each one of the first set of control signals being directly and uniquely connected to one of the plurality of switches in the Step-Up stage, and each one of the second set of control signals being directly and uniquely connected to one of the plurality of switches in the Step-Down stage,
a first comparator configured to generate a first pulse-width modulated, PWM, control signal based on a comparison of the error signal with a first saw signal,
a second comparator configured to generate a second PWM control signal based on a comparison of the error signal with a second saw signal that is different from the first saw signal,
a control unit configured to generate the first control signals and the second control signals based on the first PWM control signal and the second PWM control signal, respectively, and
means for controlling an offset of the first saw signal such that a minimum voltage value of said first saw signal to be proportional to the input voltage.

7. The DC-DC converter of claim 6, wherein the step-down stage input is directly connected to the step-up stage output.

8. The DC-DC converter of claim 6, wherein, in a first mode of operation, the controller is adapted to cause the first control signals and the second control signals to toggle so that the Step-Up stage and the Step-Down stage are simultaneously activated.

9. The DC-DC converter of claim 6, wherein in a second mode of operation, the controller is configured to cause only the first control signals, not the second control signals to toggle so that only the Step-Down stage is activated.

10. The DC-DC converter of claim 6, wherein the controller is configured to limit a maximum duty cycle for the Step-Up stage by pulse-width modulated, PWM, masking.

11. A DC-DC converter, comprising:
an input terminal configured to receive an input voltage;
a Step-Up stage having a step-up stage input connected to the input terminal to receive the input voltage, and a step-up stage output, said Step-Up stage including a plurality of switches therein;
a Step-Down stage having a step-down stage input coupled to the step-up stage output and a step-down stage output, said Step-Down stage including a plurality of switches therein, said Step-Up stage and Step-Down stage being controlled by a first set of control signals and by a second set of control signals, respectively;
an output terminal connected to the step-down stage output so as to receive an output voltage of said Step-Down stage to drive a load coupled to said output terminal; and,
a controller configured to generate the first set of control signals and the second set of control signals, said controller comprising
a single error signal generator configured to generate a single error signal from a difference between a voltage at the step-down stage output and a single reference voltage, and to generate both the first set of control signals and the second set of control signals from said error signal, each one of the first set of control signals being directly and uniquely connected to one of the plurality of switches in the Step-Up stage, and each one of the second set of control signals being directly and uniquely connected to one of the plurality of switches in the Step-Down stage,
a first comparator configured to generate a first pulse-width modulated, PWM, control signal based on a comparison of the error signal with a first saw signal,
a second comparator configured to generate a second PWM control signal based on a comparison of the error signal with a second saw signal that is different from the first saw signal, and,
a control unit configured to generate the first control signals and the second control signals based on the first PWM control signal and the second PWM control signal, respectively,
wherein a duty-cycle of the first PWM control signal and a duty-cycle of the second PWM control signal are managed by tuning a magnitude value and an average value of the first saw signal and of second saw signal, respectively.

12. The DC-DC converter of claim 11, wherein the step-down stage input is directly connected to the step-up stage output.

13. The DC-DC converter of claim 11, wherein, in a first mode of operation, the controller is adapted to cause the first control signals and the second control signals to toggle so that the Step-Up stage and the Step-Down stage are simultaneously activated.

14. The DC-DC converter of claim 11, wherein in a second mode of operation, the controller is configured to cause only the first control signals, not the second control signals to toggle so that only the Step-Down stage is activated.

15. The DC-DC converter of claim 11, wherein the controller is configured to limit a maximum duty cycle for the Step-Up stage by pulse-width modulated, PWM, masking.

16. A portable electronic device comprising:
a battery configured to provide a battery voltage;
a DC-DC converter configured to generate a supply voltage from the battery voltage, the supply voltage being higher than said battery voltage, the DC-DC converter including
an input terminal configured to receive the battery voltage;
a Step-Up stage having a step-up stage input connected to the input terminal to receive the input voltage and a step-up stage output, said Step-Up stage including a plurality of switches therein;
a Step-Down stage having a step-down input coupled to the step-up stage output, and a step-down output, said Step-Down stage including a plurality of switches therein, said Step-Up stage and Step-Down stage being controlled by a first set of control signals and by a second set of control signals, respectively;
an output terminal connected to the step-down stage output so as to receive the supply voltage from the step-down stage output; and,
a controller configured to generate the first set of control signals and the second set of control signals, said controller having
a single error signal generator configured to generate a single error signal from a difference between a voltage at the step-down stage output and a single reference voltage, and to generate both the first set of control signals and the second set of control signals from said error signal, each one of the first set of control signals being directly and uniquely connected to one of the plurality of switches in the Step-Up stage, and each one of the second set of control signals being directly and uniquely connected to one of the plurality of switches in the Step-Down stage,
a first comparator configured to generate a first pulse-width modulated, PWM, control signal based on a comparison of the error signal with a first saw signal,
a second comparator configured to generate a second PWM control signal based on a comparison of the error signal with a second saw signal that is different from the first saw signal, and,
a control unit configured to generate the first control signals and the second control signals based on the first PWM control signal and the second PWM control signal, respectively; and,
a Radio-Frequency Power Amplifier powered by the supply voltage,
wherein
the controller is configured to control a magnitude of the first saw signal to be proportional to a voltage at the step-up stage output,
the DC-DC converter further comprises means for controlling an offset of the first saw signal such that a minimum voltage value of said first saw signal to be proportional to the input voltage, and/or
a duty-cycle of the first PWM control signal and a duty-cycle of the second PWM control signal are managed by tuning a magnitude value and an average value of the first saw signal and of second saw signal, respectively.

* * * * *